(12) United States Patent
Broughton

(10) Patent No.: US 9,052,086 B2
(45) Date of Patent: Jun. 9, 2015

(54) METHOD AND SYSTEM FOR MANAGING LIGHT FROM A LIGHT EMITTING DIODE

(75) Inventor: Kevin Charles Broughton, Sharpsburg, GA (US)

(73) Assignee: Cooper Technologies Company, Houston, TX (US)

(*) Notice: Subject to any disclaimer, the term of this patent is extended or adjusted under 35 U.S.C. 154(b) by 182 days.

(21) Appl. No.: 13/407,401

(22) Filed: Feb. 28, 2012

(65) Prior Publication Data

US 2012/0300488 A1 Nov. 29, 2012

Related U.S. Application Data

(60) Provisional application No. 61/447,173, filed on Feb. 28, 2011.

(51) Int. Cl.
| | |
|---|---|
| F21V 5/00 | (2006.01) |
| F21V 33/00 | (2006.01) |
| F21V 5/04 | (2006.01) |
| F21V 5/08 | (2006.01) |
| G02B 19/00 | (2006.01) |

(Continued)

(52) U.S. Cl.
CPC ... *F21V 5/04* (2013.01); *F21V 5/08* (2013.01); *F21W 2131/103* (2013.01); *F21Y 2101/02* (2013.01); *G02B 19/0028* (2013.01); *G02B 19/0061* (2013.01)

(58) Field of Classification Search
USPC ......... 362/311.01–311.1, 326, 327, 334, 335, 362/317
See application file for complete search history.

(56) References Cited

U.S. PATENT DOCUMENTS

| 1,758,977 A | | 4/1926 | Rolph |
| 2,215,900 A | * | 9/1940 | Bitner ............................ 362/309 |

(Continued)

FOREIGN PATENT DOCUMENTS

| CN | 2750186 | 1/2006 |
| CN | 1737418 | 2/2006 |

(Continued)

OTHER PUBLICATIONS

Aoyama, Y.; Yachi, T., "An LED Module Array System Designed for Streetlight Use," Energy 2030 Conference, 2008. Energy 2008. IEEE , vol., no., pp. 1-5, Nov. 17-18, 2008, doi: 10.1109/ENERGY.2008. 4780996; URL: http://ieeexplore.ieee.org/stamp/stamp.jsp?tp=&arnumber=4780996&isnumber=4780986.

(Continued)

*Primary Examiner* — Sikha Roy
(74) *Attorney, Agent, or Firm* — King & Spalding LLP

(57) ABSTRACT

A light source, for example a light emitting diode, can emit light and have an associated optical axis. The source can be deployed in applications where it is desirable to have illumination biased laterally relative to the optical axis, such as in a street luminaire where directing light towards a street is beneficial. The source can be coupled to an optic that comprises an inner surface facing the source and an outer surface that is opposite the inner surface. The inner surface can comprise a refractive surface that receives light headed away from the optical axis of the light source, for example opposite the street. The refractive surface can form the received light into a beam. The outer surface of the optic can reflect the beam back across the optical axis, for example so that light headed away from the street is redirected towards the street.

20 Claims, 15 Drawing Sheets

(51) Int. Cl.
*F21W 131/103* (2006.01)
*F21Y 101/02* (2006.01)

(56) References Cited

U.S. PATENT DOCUMENTS

| | | | |
|---|---|---|---|
| 2,254,961 A | 9/1941 | Harris |
| 2,394,992 A | 2/1946 | Franck |
| 2,818,500 A | 7/1953 | Franck |
| 2,908,197 A | 10/1959 | Wells et al. |
| 3,278,743 A | 12/1963 | Franck |
| 3,596,136 A | 7/1971 | Fischer |
| 3,647,148 A | 3/1972 | Wince |
| 3,927,290 A | 12/1975 | Denley |
| 4,345,308 A | 8/1982 | Mouyard et al. |
| 4,460,945 A | 7/1984 | Chan |
| 4,729,076 A | 3/1988 | Masami |
| 4,734,836 A | 3/1988 | Negishi |
| 4,860,177 A | 8/1989 | Simms |
| 4,907,044 A | 3/1990 | Schellhorn et al. |
| 4,941,072 A | 7/1990 | Yasumoto |
| 5,404,869 A | 4/1995 | Parkyn |
| 5,424,931 A | 6/1995 | Wheeler |
| 5,636,057 A | 6/1997 | Dick et al. |
| 5,782,555 A | 7/1998 | Hochstein |
| 5,857,767 A | 1/1999 | Hochstein |
| 5,924,788 A | 7/1999 | Parkyn, Jr. |
| 5,926,320 A | 7/1999 | Parkyn |
| 5,939,996 A | 8/1999 | Kniveton et al. |
| 6,045,240 A | 4/2000 | Hochstein |
| 6,050,707 A | 4/2000 | Kondo et al. |
| 6,102,558 A | 8/2000 | Farnoux |
| 6,227,684 B1 | 5/2001 | Wijbenga |
| 6,227,685 B1 | 5/2001 | McDermott |
| 6,273,596 B1 | 8/2001 | Parkyn, Jr. |
| 6,341,466 B1 | 1/2002 | Kehoe et al. |
| 6,345,800 B1 | 2/2002 | Herst et al. |
| 6,441,558 B1 | 8/2002 | Muthu et al. |
| 6,461,008 B1 | 10/2002 | Pederson |
| 6,502,956 B1 | 1/2003 | Wu |
| 6,527,422 B1 | 3/2003 | Hutchison |
| 6,536,923 B1 | 3/2003 | Merz |
| 6,547,423 B2 | 4/2003 | Marshall |
| 6,560,038 B1 | 5/2003 | Parkyn et al. |
| 6,582,103 B1 | 6/2003 | Popovich et al. |
| 6,598,998 B2 | 7/2003 | West et al. |
| 6,639,733 B2 | 10/2003 | Minano |
| 6,784,357 B1 | 8/2004 | Wang |
| 6,785,053 B2 | 8/2004 | Savage, Jr. |
| 6,837,605 B2 | 1/2005 | Reill |
| 6,850,001 B2 | 2/2005 | Takekuma |
| 6,895,334 B2 | 5/2005 | Yabe |
| 6,942,361 B1 | 9/2005 | Kishimura et al. |
| 6,948,838 B2 | 9/2005 | Kunstler |
| 6,965,715 B2 | 11/2005 | Lei |
| 6,997,580 B2 | 2/2006 | Wong |
| 7,070,310 B2 | 7/2006 | Pond et al. |
| 7,073,931 B2 | 7/2006 | Ishida |
| 7,090,370 B2 | 8/2006 | Clark |
| 7,102,172 B2 | 9/2006 | Lynch et al. |
| 7,104,672 B2 | 9/2006 | Zhang |
| 7,153,015 B2 | 12/2006 | Brukilacchio |
| 7,172,319 B2 | 2/2007 | Holder |
| 7,181,378 B2 | 2/2007 | Benifez |
| 7,204,627 B2 | 4/2007 | Hishida |
| 7,237,936 B1 | 7/2007 | Gibson |
| 7,278,761 B2 | 10/2007 | Kuan |
| 7,281,820 B2 | 10/2007 | Bayat et al. |
| 7,322,718 B2 | 1/2008 | Setomoto et al. |
| D563,036 S | 2/2008 | Miyairi et al. |
| 7,329,029 B2 | 2/2008 | Chaves et al. |
| 7,329,030 B1 | 2/2008 | Wang |
| 7,329,033 B2 | 2/2008 | Glovatsky |
| 7,339,200 B2 | 3/2008 | Amano et al. |
| 7,347,599 B2 | 3/2008 | Minano et al. |
| 7,348,604 B2 | 3/2008 | Matheson |
| 7,348,723 B2 | 3/2008 | Yamaguchi et al. |
| 7,352,011 B2 | 4/2008 | Smits et al. |
| 7,374,322 B2 | 5/2008 | Steen et al. |
| 7,410,275 B2 | 8/2008 | Sommers et al. |
| D577,852 S | 9/2008 | Miyairi et al. |
| 7,460,985 B2 | 12/2008 | Benitez |
| 7,461,948 B2 | 12/2008 | Van Voorst Vader et al. |
| 7,507,001 B2 | 3/2009 | Kit |
| 7,513,639 B2 | 4/2009 | Wang |
| 7,553,051 B2 | 6/2009 | Brass |
| 7,569,802 B1 | 8/2009 | Mullins |
| 7,572,027 B2 | 8/2009 | Zampini, II |
| 7,572,654 B2 | 8/2009 | Chang |
| 7,575,354 B2 | 8/2009 | Woodward |
| 7,582,913 B2 | 9/2009 | Huang et al. |
| 7,618,162 B1 | 11/2009 | Parkyn et al. |
| 7,618,163 B2 | 11/2009 | Wilcox |
| 7,625,102 B2 | 12/2009 | Koike et al. |
| 7,637,633 B2 | 12/2009 | Wong |
| 7,651,240 B2 | 1/2010 | Bayat et al. |
| 7,674,018 B2 | 3/2010 | Holder et al. |
| 7,748,872 B2 | 7/2010 | Holder et al. |
| 7,775,679 B2 | 8/2010 | Thrailkill et al. |
| 7,777,405 B2 | 8/2010 | Steen et al. |
| 7,809,237 B2 | 10/2010 | Pozdnyakov et al. |
| 7,817,909 B2 * | 10/2010 | Montgomery et al. ......... 396/62 |
| 7,841,750 B2 | 11/2010 | Wilcox et al. |
| 7,854,536 B2 | 12/2010 | Holder |
| 7,942,559 B2 | 5/2011 | Holder |
| 7,972,035 B2 | 7/2011 | Boyer |
| 7,972,036 B1 | 7/2011 | Schach et al. |
| 7,993,036 B2 | 8/2011 | Holder et al. |
| 8,007,140 B2 | 8/2011 | Zhang et al. |
| 8,025,428 B2 | 9/2011 | Duguay et al. |
| 8,210,722 B2 | 7/2012 | Holder et al. |
| 8,382,338 B2 * | 2/2013 | Lee ......................... 362/311.06 |
| 2002/0034081 A1 | 3/2002 | Serizawa |
| 2002/0196623 A1 | 12/2002 | Yen |
| 2003/0067787 A1 | 4/2003 | Serizawa |
| 2003/0099115 A1 | 5/2003 | Reill |
| 2004/0004828 A1 | 1/2004 | Chernick |
| 2004/0037076 A1 | 2/2004 | Katoh et al. |
| 2004/0070855 A1 | 4/2004 | Benitez et al. |
| 2004/0105171 A1 | 6/2004 | Minano et al. |
| 2004/0105261 A1 | 6/2004 | Ducharme |
| 2004/0105264 A1 | 6/2004 | Spero |
| 2004/0189933 A1 | 9/2004 | Sun et al. |
| 2004/0207999 A1 | 10/2004 | Suehiro |
| 2004/0218388 A1 | 11/2004 | Suzuki |
| 2004/0222947 A1 | 11/2004 | Newton et al. |
| 2004/0228127 A1 | 11/2004 | Squicciarini |
| 2005/0073849 A1 | 4/2005 | Rhoads et al. |
| 2005/0207165 A1 | 9/2005 | Shimizu et al. |
| 2006/0034082 A1 | 2/2006 | Park |
| 2006/0039143 A1 | 2/2006 | Katoh |
| 2006/0081863 A1 | 4/2006 | Kim et al. |
| 2006/0083003 A1 | 4/2006 | Kim et al. |
| 2006/0138437 A1 | 6/2006 | Huang et al. |
| 2006/0238884 A1 | 10/2006 | Jang |
| 2006/0245083 A1 | 11/2006 | Chou et al. |
| 2006/0250803 A1 | 11/2006 | Chen |
| 2006/0255353 A1 | 11/2006 | Taskar |
| 2006/0285311 A1 | 12/2006 | Chang et al. |
| 2007/0019415 A1 | 1/2007 | Leblanc |
| 2007/0019416 A1 | 1/2007 | Han |
| 2007/0058369 A1 | 3/2007 | Parkyn et al. |
| 2007/0063210 A1 | 3/2007 | Chiu |
| 2007/0066310 A1 | 3/2007 | Haar |
| 2007/0076414 A1 | 4/2007 | Holder |
| 2007/0081338 A1 | 4/2007 | Kuan |
| 2007/0081340 A1 | 4/2007 | Chung et al. |
| 2007/0091615 A1 | 4/2007 | Hsieh et al. |
| 2007/0183736 A1 | 8/2007 | Pozdnyakov |
| 2007/0201225 A1 | 8/2007 | Holder |
| 2007/0258214 A1 | 11/2007 | Shen |
| 2008/0013322 A1 | 1/2008 | Ohkawa |
| 2008/0019129 A1 | 1/2008 | Wang |
| 2008/0025044 A1 | 1/2008 | Park et al. |
| 2008/0043473 A1 | 2/2008 | Matsui |

(56) References Cited

U.S. PATENT DOCUMENTS

| | | | |
|---|---|---|---|
| 2008/0055908 A1 | 3/2008 | Wu | |
| 2008/0068799 A1 | 3/2008 | Chan | |
| 2008/0080188 A1 | 4/2008 | Wang | |
| 2008/0100773 A1 | 5/2008 | Hwang | |
| 2008/0174996 A1 | 7/2008 | Lu | |
| 2008/0239722 A1 | 10/2008 | Wilcox | |
| 2008/0273327 A1 | 11/2008 | Wilcox et al. | |
| 2009/0027884 A1* | 1/2009 | Chou | 362/240 |
| 2009/0244895 A1 | 10/2009 | Chen | |
| 2009/0262543 A1 | 10/2009 | Ho | |
| 2010/0014290 A1 | 1/2010 | Wilcox | |
| 2010/0039810 A1* | 2/2010 | Holder et al. | 362/235 |
| 2011/0157891 A1* | 6/2011 | Davis et al. | 362/244 |

FOREIGN PATENT DOCUMENTS

| | | |
|---|---|---|
| DE | 202006015981 | 1/2007 |
| EP | 1431653 | 6/2004 |
| GB | 718425 | 11/1954 |
| GB | 794670 | 5/1958 |
| GB | 815609 | 7/1959 |
| JP | 06-177424 | 6/1994 |
| JP | 11/154766 | 9/1997 |
| JP | 2001-517855 | 9/1998 |
| JP | 2005-062461 | 3/2005 |
| JP | 2009-021086 | 1/2009 |
| KR | 10-2006-0033572 | 4/2006 |
| KR | 10-2006-0071033 | 6/2006 |
| KR | 20070015738 | 2/2007 |
| KR | 20100015957 | 2/2010 |
| KR | 20100105388 | 9/2010 |
| WO | WO 9624802 | 8/1996 |
| WO | WO 98/33007 | 7/1998 |
| WO | WO 03044870 | 5/2003 |
| WO | WO 2004/068909 | 8/2004 |
| WO | WO 2005/041254 | 5/2005 |
| WO | WO 2005/057082 | 6/2005 |
| WO | WO 2005/093316 | 10/2005 |
| WO | WO 2007/100837 | 9/2007 |
| WO | WO 2008/144672 | 11/2008 |
| WO | WO 2010/019810 | 2/2010 |
| WO | WO 2011/098515 | 8/2011 |

OTHER PUBLICATIONS

Petroski, J.; Norley, J.; Schober, J.; Reis, B.; Reynolds, R.A.;, "Conduction cooling of large LED array systems," Thermal and Thermomechanical Phenomena in Electronic Systems (ITherm), 2010 12th IEEE Intersociety Conference on, vol., no., pp. 1-10, Jun. 2-5, 2010; doi: 10.1109/ITHERM.2010.5501350; URL: http://ieeexplore.ieee.org/stamp/stamp.jsp?tp=&arnumber=5501350&isnumber=5501251.

Wankhede, M.; Khaire, V.; Goswami, A.; Mahajan, S.D.;, "Evaluation of Cooling Solutions for Out-door Electronics," Electronics Packaging Technology Conference, 2007. EPTC 2007. 9th, vol., no., pp. 858-863, Dec. 10-12, 2007; doi: 10.1109/EPTC.2007.4469682; URL: http://ieeexplore.ieee.org/stamp/stamp.jsp?tp=&arnumber=4469682&isnumber=4469670.

Order, Case No. 11-CV-34-JPS; United States District Court Eastern District of Wisconsin; filed Oct. 31, 2012.

LED's Magazine; High-Power LED's; multi-watt LED light Engines Offer Challenges and Opportunities; ledmagazine.com Oct. 2005.

Timinger, "Tailored Optical Surfaces Step up Illumination Design," Europhonics; Aug./Sep. 2002 (color copy).

Plantiff Illumination Management Solutions, Inc.'s Initial Claim Construction Brief; Case No. 2:11-cv-00034 JPS; Apr. 5, 2012.

Extended Search Report for EP Application No. 08755907.6 mailed May 10, 2012.

Timinger, Andreas, Strategies Unlimited, "Charting New Directions in High-Brightness LED's," Strategies in Light, Feb. 5-7, 2005.

Timinger, Andreas, "Optical Design for LED-Street Lamps," Conference Paper, Solid-State and Organic Lighting (SOLED), Karlsruhe, Germany, Jun. 21, 2010.

Ruud Lighting's Notice Pursuant to 35 U.S.C. §282; Civial Action 2:11-cv-00034-JPS; Oct. 12, 2012.

Order; Case No. 11-CV-34-JPS; United States District Court Eastern District Of Wisconsin; Jun. 8, 2012.

International Search Report for PCT/US11/049388 mailed on Apr. 9, 2012.

Streetworks fixture from Cooper Lighting and 2 IES files, Aug. 14, 2001.

Bisberg, *LED Magazine*, The 5mm. Package Versus the Power LED: Not a Light choice for the Luminaire Designer, pp. 19-21, Dec. 2005.

*LED Magazine*, p. 36 Oct. 2005.

International Search Report and Written Opinion for WO 2010/019810 mailed Sep. 30, 2009.

International Search Report and Written Opinion for WO 2008/144672 mailed Nov. 27, 2008.

ISR and Written Opinion of ISA, PCT/US07/05118 mailed Mar. 11, 2008.

Bortz, "Optimal Design of a Non imaging Projection Lens for Use with an LED Light Source and a Rectangular Sheet." SPIE, pp. 130-138, vol. 4092, USA, published 2000.

International Search Report for PCT/US08/64168 mailed on Aug. 15, 2008.

Extended Search Report for EP Application No. 11006191 mailed Nov. 7, 2011.

Extended Search Report for EP Application No. 11006189 mailed Nov. 7, 2011.

Extended Search Report for EP Application No. 1100611006190 mailed Nov. 7, 2011.

Timinger, Dr. Andreas, *High Performance Optics Design for LEDs*, Strategies in Light, Feb. 2005.

Ries, Harold & Julius Muschaweck, *Tailored Freeform Optical Surfaces*, Optical Society of America, vol. 19, No. 3, Mar. 2002.

Jolley L.B.W. et al., The Therory and Design of Illuminating Engineering Equipment, 1931, pp. 297-317.

International Search Report for PCT/US2012/036945; mailed Oct. 12, 2012.

* cited by examiner

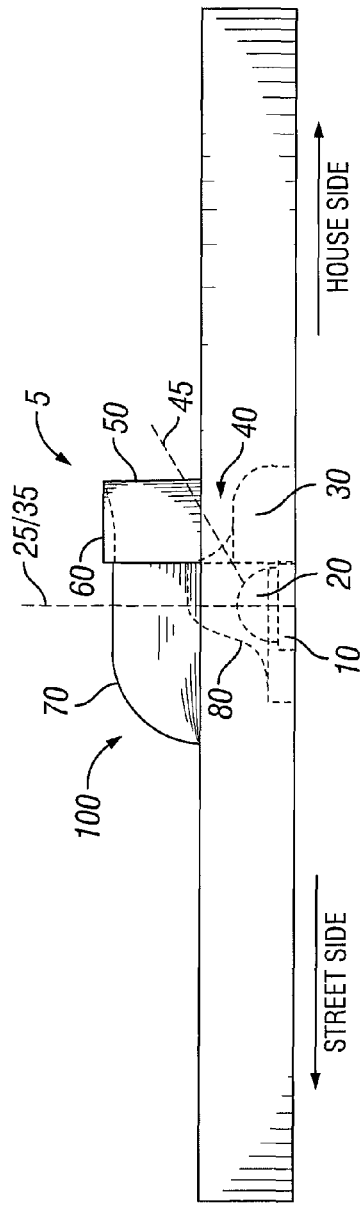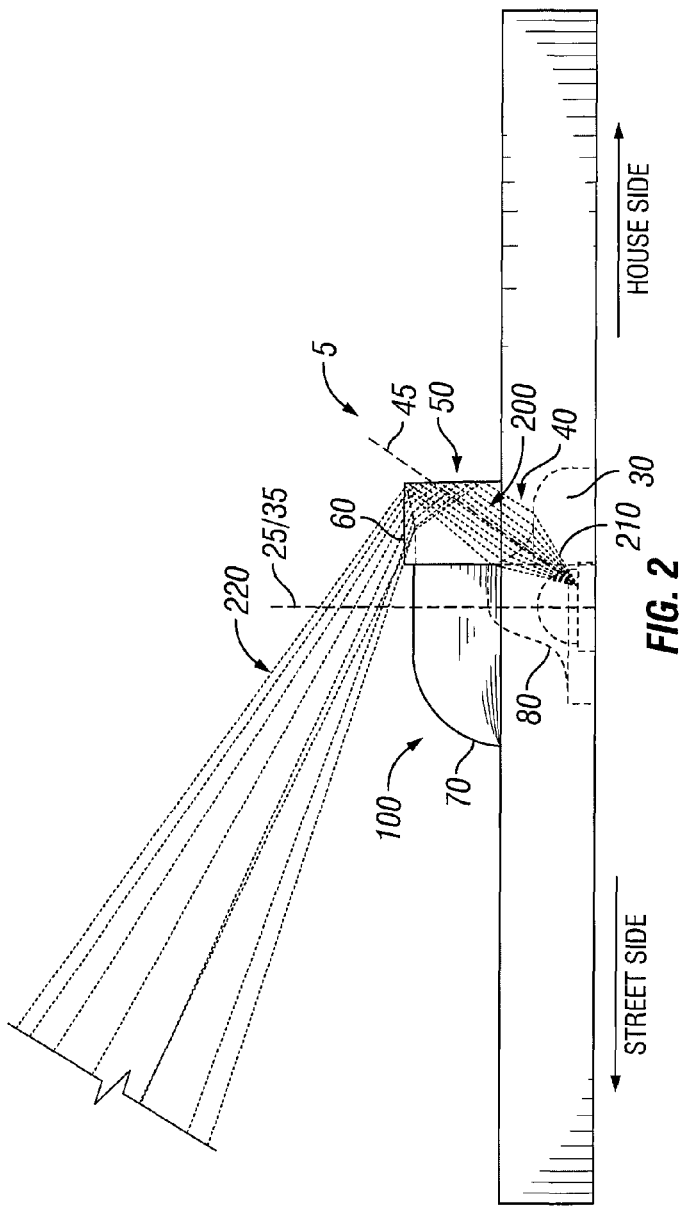
FIG. 1
FIG. 2

HOUSE SIDE ←　　　→ STREET SIDE

HOUSE SIDE ←　　　→ STREET SIDE

METHOD AND SYSTEM FOR MANAGING LIGHT FROM A LIGHT EMITTING DIODE

CROSS REFERENCE TO RELATED APPLICATIONS

This application claims priority to U.S. Provisional Patent Application No. 61/447,173 filed Feb. 28, 2011 in the name of Kevin Charles Broughton and entitled "Method and System for Managing Light From a Light Emitting Diode," the entire contents of which are hereby incorporated herein by reference.

FIELD OF THE TECHNOLOGY

The present technology relates to managing light emitted by one or more light emitting diodes ("LEDs"), and more specifically to an optical element that can form a beam from a section of such emitted light and that can apply total internal reflection to direct such a beam towards a desired location.

BACKGROUND

Light emitting diodes are useful for indoor and outdoor illumination, as well as other applications. Many such applications would benefit from an improved technology for managing light produced by a light emitting diode, such as forming an illumination pattern matched or tailored to application parameters.

For example, consider lighting a street running along a row of houses, with a sidewalk between the houses and the street. Conventional, unbiased light emitting diodes could be mounted over the sidewalk, facing down, so that the optical axis of an individual light emitting diode points towards the ground. In this configuration, the unbiased light emitting diode would cast substantially equal amounts of light towards the street and towards the houses. The light emitted from each side of the optical axis continues, whether headed towards the street or the houses. However, most such street lighting applications would benefit from biasing the amount of light illuminating the street relative to the amount of light illuminating the houses. Many street luminaires would thus benefit from a capability to transform house-side light into street-side light.

In view of the foregoing discussion of representative shortcomings in the art, need for improved light management is apparent. Need exists for a compact apparatus to manage light emitted by a light emitting diode. Need further exists for an economical apparatus to manage light emitted by a light emitting diode. Need further exists for a technology that can efficiently manage light emitted by a light emitting diode, resulting in energy conservation. Need further exists for an optical device that can transform light emanating from a light emitting diode into a desired pattern, for example aggressively redirecting one or more selected sections of the emanating light. Need further exists for technology that can directionally bias light emitted by a light emitting diode. Need exists for improved lighting, including street luminaires, outdoor lighting, and general illumination. A capability addressing such need, or some other related deficiency in the art, would support cost effective deployment of light emitting diodes in lighting and other applications.

SUMMARY

An apparatus can process light emitted by one or more light emitting diodes to form a desired illumination pattern, for example successively applying refraction and total internal reflection to light headed in certain directions, resulting in beneficial redirection of that light.

In one aspect of the present technology, a light emitting diode can produce light and have an associated optical axis. A body of optical material can be oriented with respect to the light emitting diode to process the produced light. The body can be either seamless or formed from multiple elements joined or bonded together, for example. A first section of the produced light can transmit through the body of optical material, for example towards an area to be illuminated. The body of optical material can redirect a second section of the produced light, for example so that light headed in a non-strategic direction is redirected towards the area to be illuminated. A refractive surface on an interior side of the body of optical material can form a beam from the second section of the produced light. The beam can propagate in the optical material at an angle relative to the optical axis of the light emitting diode while heading towards a reflective surface on an exterior side of the body of optical material. Upon beam incidence, the reflective surface can redirect the beam out of the body of optical material, for example through a surface region that refracts the beam as the beam exits the body of optical material. The refraction can cause beam divergence, for example. The reflective surface can be reflective as a result of comprising an interface between a transparent optical material having a relatively high refractive index and an optical medium having relatively low refractive index, such as a totally internally reflective interface between optical plastic and air. Alternatively, the reflective surface can comprise a coating that is reflective, such as a sputtered aluminum coating applied to a region of the body of optical material.

The foregoing discussion of managing light is for illustrative purposes only. Various aspects of the present technology may be more clearly understood and appreciated from a review of the following detailed description of the disclosed embodiments and by reference to the drawings and the claims that follow. Moreover, other aspects, systems, methods, features, advantages, and objects of the present technology will become apparent to one with skill in the art upon examination of the following drawings and detailed description. It is intended that all such aspects, systems, methods, features, advantages, and objects are to be included within this description, are to be within the scope of the present technology, and are to be protected by the accompanying claims.

BRIEF DESCRIPTION OF THE DRAWINGS

FIG. 1 is an illustration of an illumination system comprising a light emitting diode and an optic that manages light emitted by the light emitting diode according to certain exemplary embodiments of the present technology.

FIG. 2 is another illustration of the illumination system that FIG. 1 illustrates, further illustrating the optic managing representative rays emitted by the light emitting diode according to certain exemplary embodiments of the present technology.

FIGS. 5A, 5B, and 5C are taken from different vantage points looking at the light-emitting side of the optic. FIGS. 5D and 5E are taken from different vantage points looking at the light-receiving side of the optic.

Figure 3:
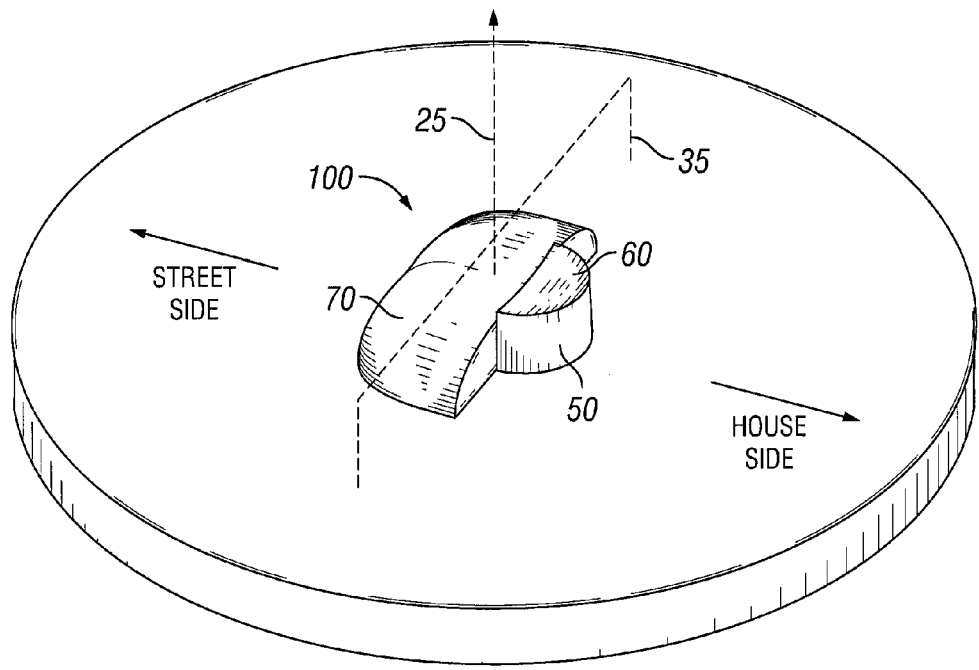
FIG. 3 is a perspective view of the illumination system that FIG. 1 illustrates, wherein the optic is depicted as opaque to promote reader visualization according to certain exemplary embodiments of the present technology.

Many aspects of the technology can be better understood with reference to the above drawings. The elements and features shown in the drawings are not to scale, emphasis instead being placed upon clearly illustrating the principles of exemplary embodiments of the present technology. Moreover, certain dimensions may be exaggerated to help visually convey such principles. In the drawings, reference numerals designate like or corresponding, but not necessarily identical, elements throughout the several views.

DESCRIPTION OF EXEMPLARY EMBODIMENTS

A light source can emit light. In certain embodiments, the light source can be or comprise one or more light emitting diodes, for example. The light source and/or the emitted light can have an associated optical axis. The light source can be deployed in applications where it is desirable to bias illumination laterally relative to the optical axis. For example, in a street luminaire where the optical axis is pointed down towards the ground, it may be beneficial to direct light towards the street side of the optical axis, rather than towards a row of houses that are beside the street. The light source can be coupled to an optic that receives light propagating on one side of the optical axis and redirects that light across the optical axis. For example, the optic can receive light that is headed towards the houses and redirect that light towards the street.

The optic can comprise an inner surface facing the light source and an outer surface facing away from the light source, opposite the inner surface. The inner surface can comprise a refractive feature that receives light headed away from the optical axis of the light source, for example away from the street to be lighted. The refractive feature can comprise a convex lens surface bulging towards the light source, for example. The refractive feature can form the received, incident light into a beam headed along another optical axis. That optical axis can form an acute angle with respect to the optical axis of the light source itself. The outer surface of the optic can comprise a reflective feature that receives the beam. The reflective feature can comprise a totally internally reflective surface that reflects part, most, or substantially all of the beam back across the optical axis. In certain embodiments, the reflected beam exits the optic through a surface that causes the beam to diverge. The surface can be concave, for example. Accordingly, the optic can form a beam from light headed in a non-strategic direction and redirect the beam in a strategic direction.

Figure 7:
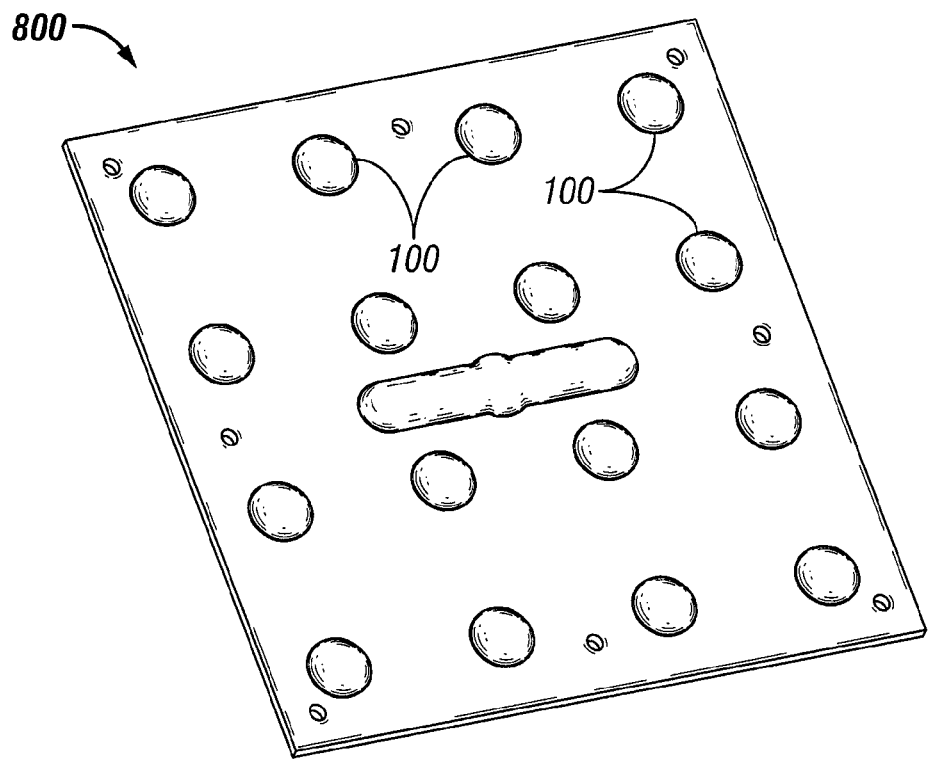
FIG. 7 is an illustration of an array of optics for coupling to a corresponding array of light emitting diodes to provide an array of the illumination systems illustrated in FIG. 1 according to certain exemplary embodiments of the present technology.
Figure 17:
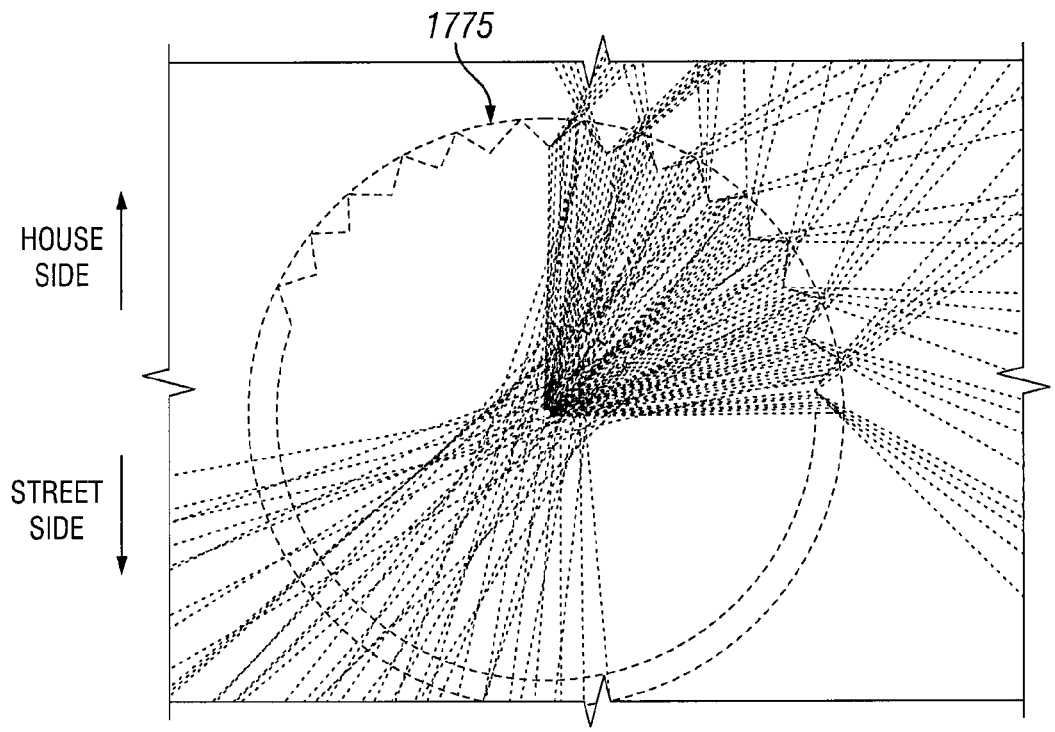
FIG. 17 is a plan view illustration of representative computer-generated ray traces for another embodiment of the illumination system that FIG. 13 illustrates according to certain exemplary embodiments of the present technology.
Figure 18:
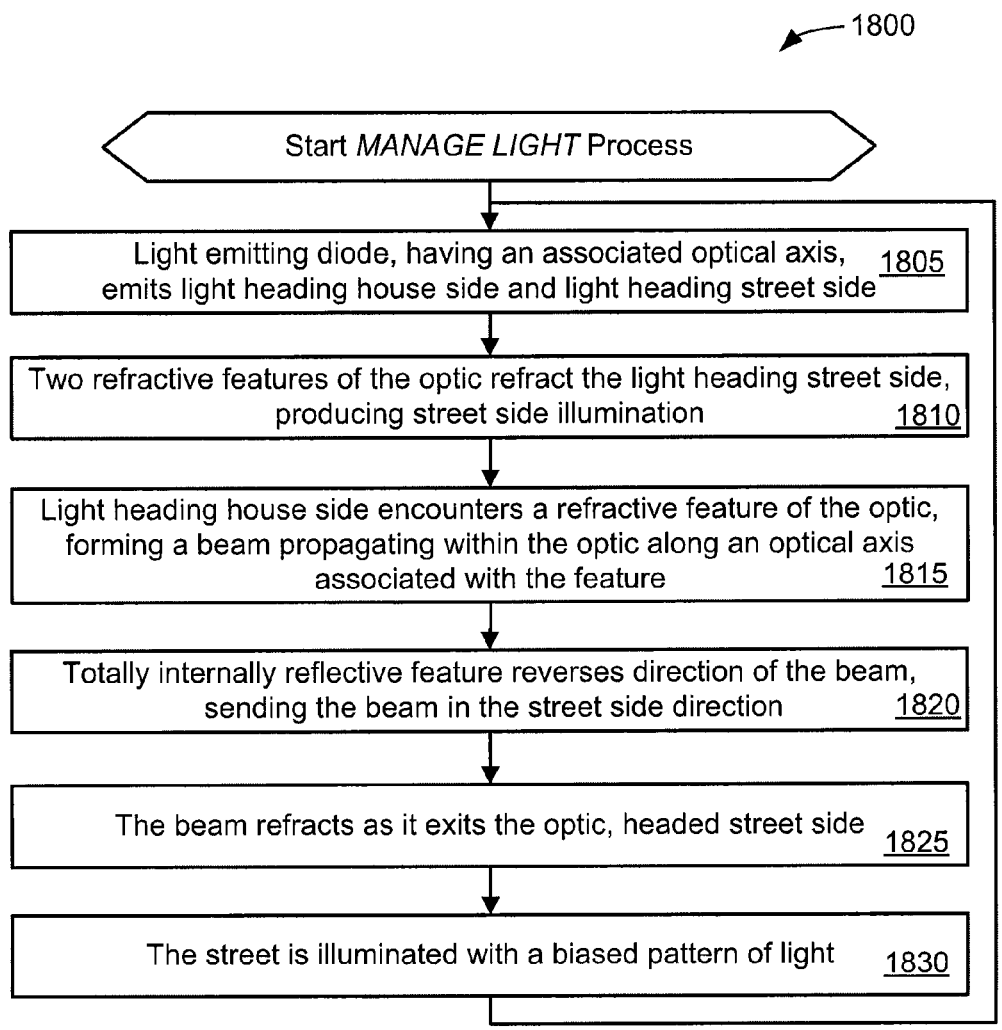
FIG. 18 is a flow chart of a process for managing light emitted by a light emitting diode according to certain exemplary embodiments of the present technology.

Technology for managing light emitted by a light emitting diode or other light source will now be described more fully with reference to FIGS. 1-18, which describe representative embodiments of the present technology. FIGS. 1, 2, 3, 4, 5, and 6 describe certain representative embodiments of an illumination system comprising a light emitting diode and an associated optic. FIG. 7 describes certain representative embodiments of a sheet comprising a two-dimensional array of optics for managing light emitted by a corresponding array of light emitting diodes. FIGS. 8, 9, 10, 11, and 12 describe certain representative embodiments of an optic for managing light emitted by a light emitting diode. FIGS. 13, 14, 15, 16, and 17 describe certain representative embodiments of an optic for managing light emitted by a light emitting diodes. FIG. 18 describes a method or process for managing light emitted by a light emitting diode. The various illustrated embodiments may be distinct and/or may have common features.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Turning now to FIGS. 1, 2, 3, 4, 5A, 5B, 5C, 5D, 5E, 6A, 6B, 6C, 6D, and 6E, these figures provide illustrations describing an exemplary embodiment of the present technology as may be applied for street illumination, as well as for other uses. As illustrated, an illumination system 5 can comprise a light emitting diode 10 that produces and emits light and an associated optic 100 managing the light so emitted. As discussed in further detail below, the light emitting diode 10 can produce light that is headed house side, opposite from the street (see light 210 illustrated in FIG. 2), and other light that is headed street side (opposite light 210 illustrated in FIG. 2). The optic 100 can redirect a substantial portion of the house-side light towards the street, where higher illumination intensity is often desired.

Those of ordinary skill having benefit of this disclosure will appreciate that street illumination is but one of many applications that the present technology supports. The present technology can be applied in numerous lighting systems and illumination applications, including indoor and outdoor lighting, automobiles, general transportation lighting, and portable lights, to mention a few representative examples without limitation.

Figure 4:
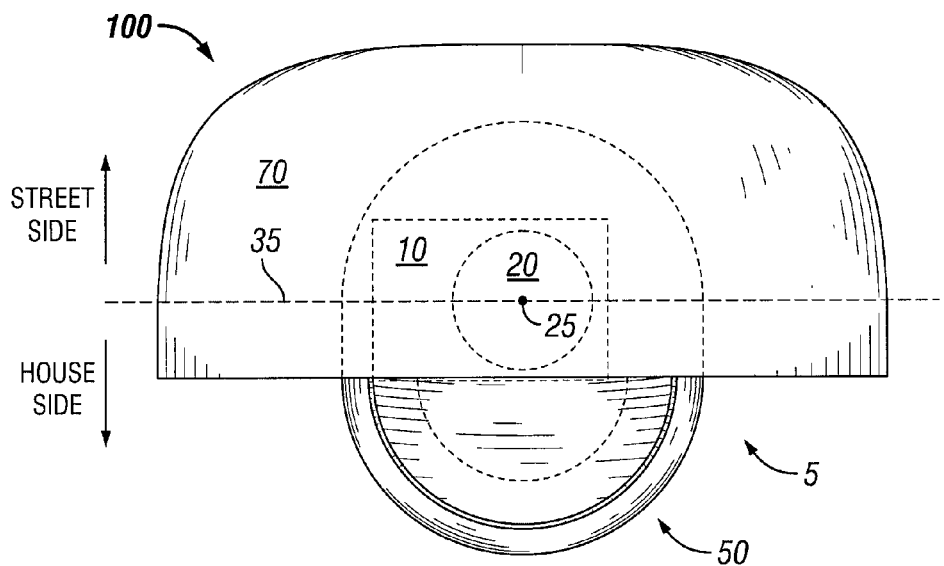
FIG. 4 is an plan view illustration of the illumination system that FIG. 1 illustrates, from a vantage point on the optical axis of the light emitting diode (looking at the light-emitting side of the optic) according to certain exemplary embodiments of the present technology.

FIGS. 1, 2, 3, 4, 5A, 5B, 5C, 5D, and 5E illustrate the optic 100 that manages light emitted by the light emitting diode 10. FIGS. 1 and 2 illustrate a side view, with FIG. 2 illustrating ray paths for a section 210 of light emitted from the light emitting diode 10. FIG. 3 illustrates a perspective view. FIG. 4 illustrates a plan view, specifically from a perspective looking down the optical axis 25 towards the light emitting dome 20 of the light emitting diode 10. Thus, if the light emitting diode 10 was mounted overhead so as to emit light towards the ground, the observer would be below the light emitting diode 10 looking straight up; and, if the light emitting diode 10 was mounted on the ground so at to emit light towards the sky or a ceiling, the observer would be above the light emitting diode 10 looking straight down.

Figure 5A:
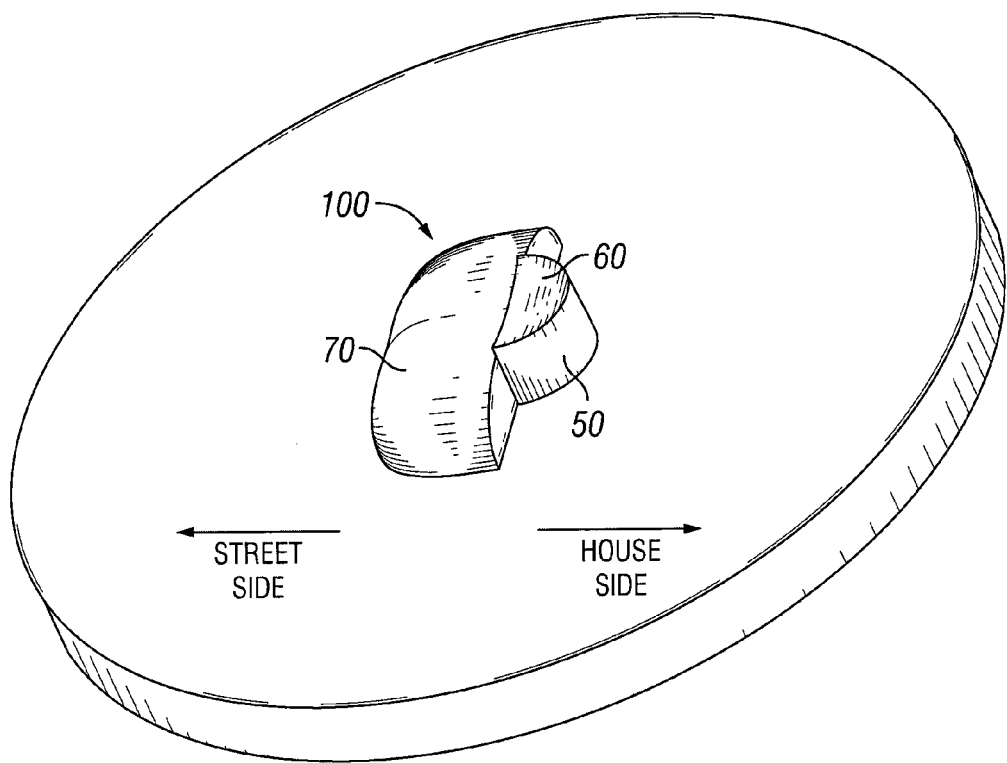
FIGS. 5A, 5B, 5C, 5D, and 5E (collectively FIG. 5) are perspective views of the optic that FIG. 1 illustrates, where the optic is depicted as opaque to promote reader visualization according to certain exemplary embodiments of the present technology.
Figure 5B:
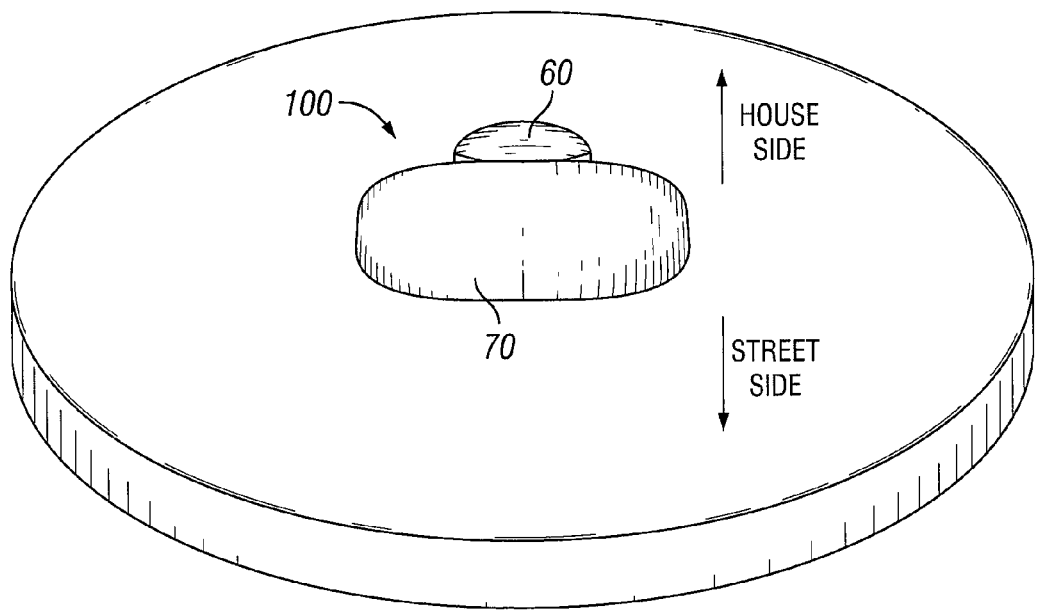
Figure 5C:
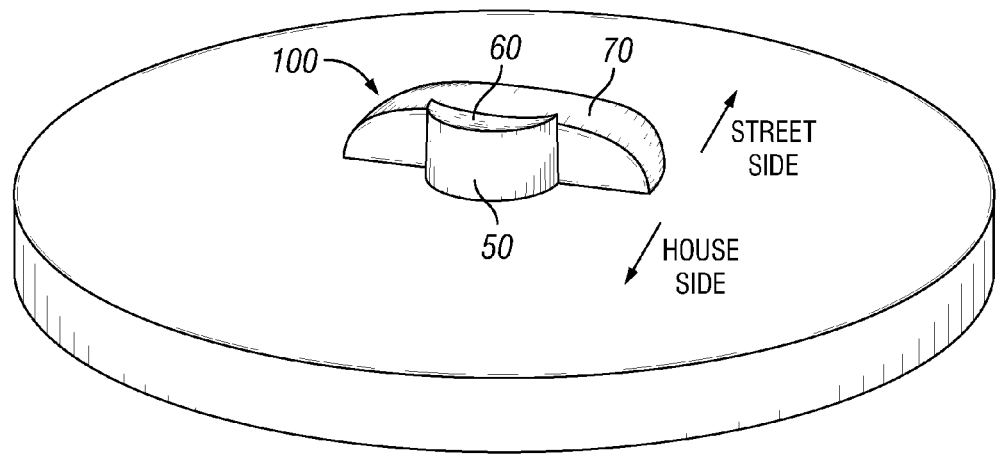
Figure 5D:
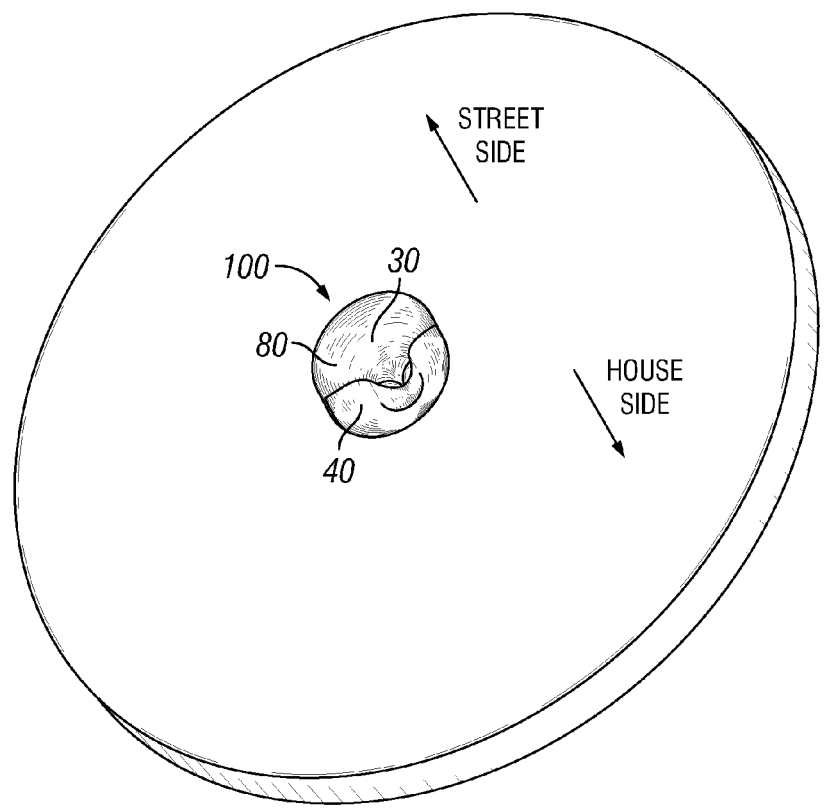
Figure 5E:
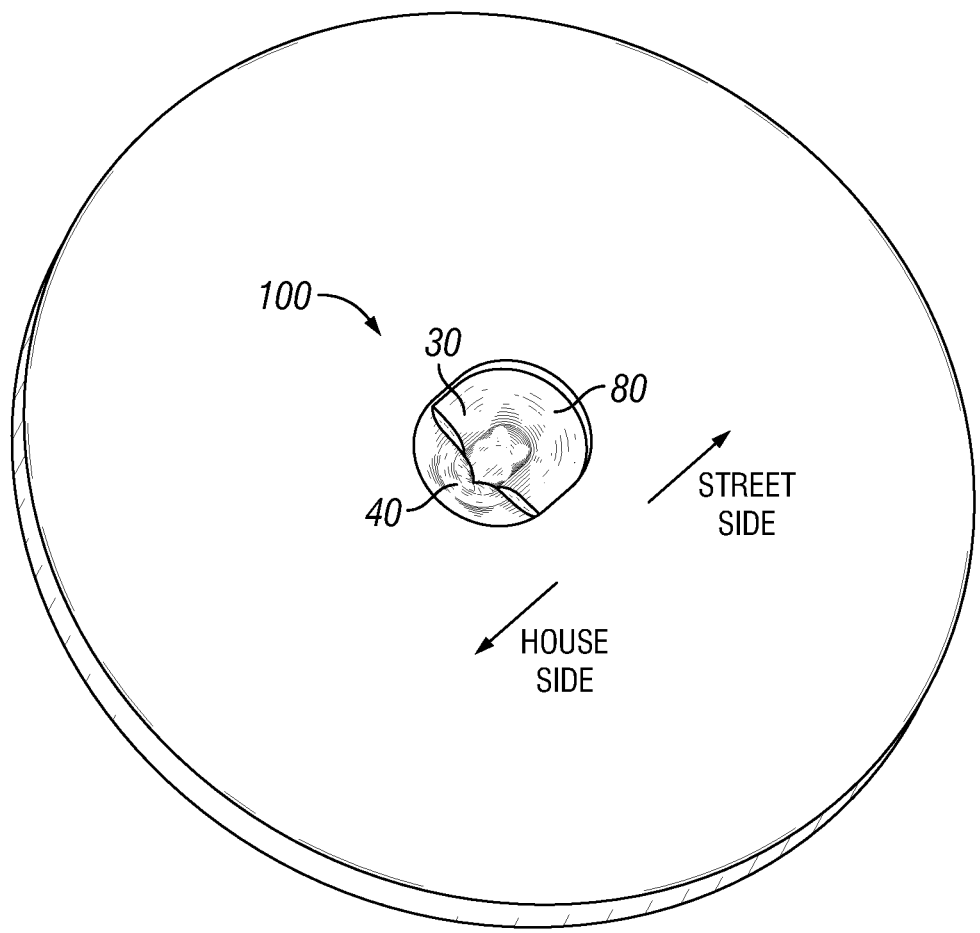
Figure 6A:
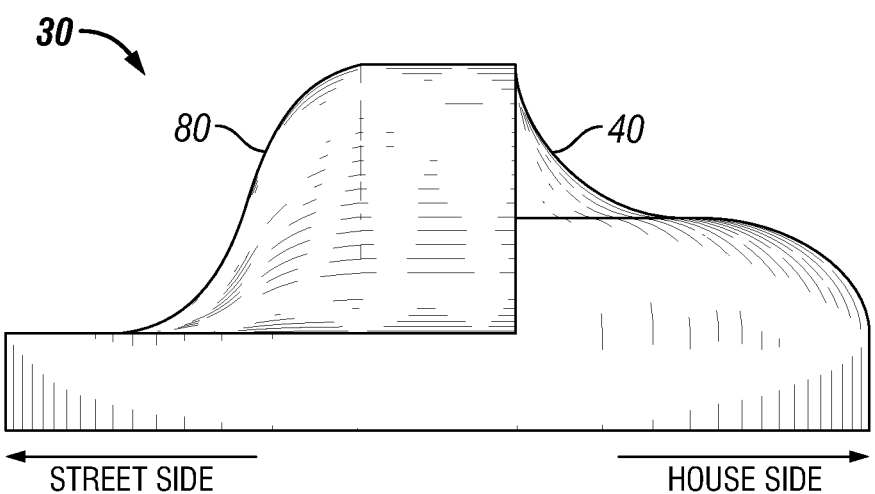
FIGS. 6A, 6B, 6C, 6D, and 6E (collectively FIG. 6) are illustrations, from different perspectives, of a cavity on the light-receiving side of the optic that FIG. 1 illustrates, where the cavity is depicted as a solid, opaque three-dimensional rendering of the cavity to promote reader visualization according to certain exemplary embodiments of the present technology. Thus, FIG. 6 describes representative contours of the light-receiving side of the optic by depicting a computer generated solid of the type that could formed by filling the cavity of the optic with a resin, curing the resin, and then separating the cured, solid resin from the optic.
Figure 6B:
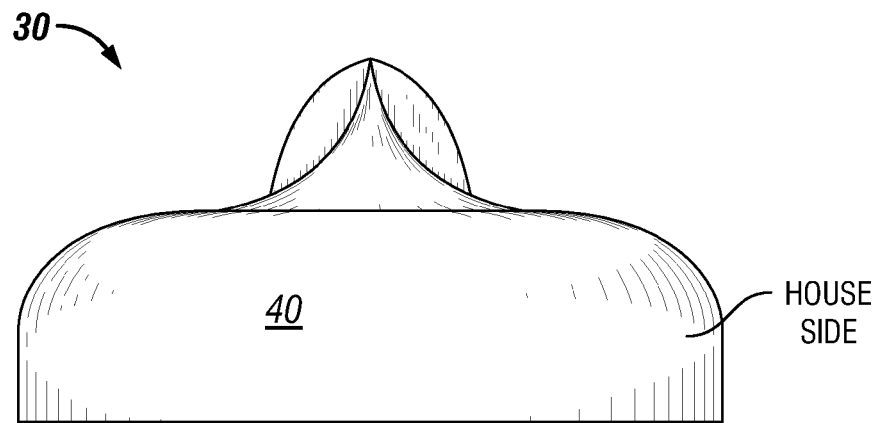
Figure 6C:
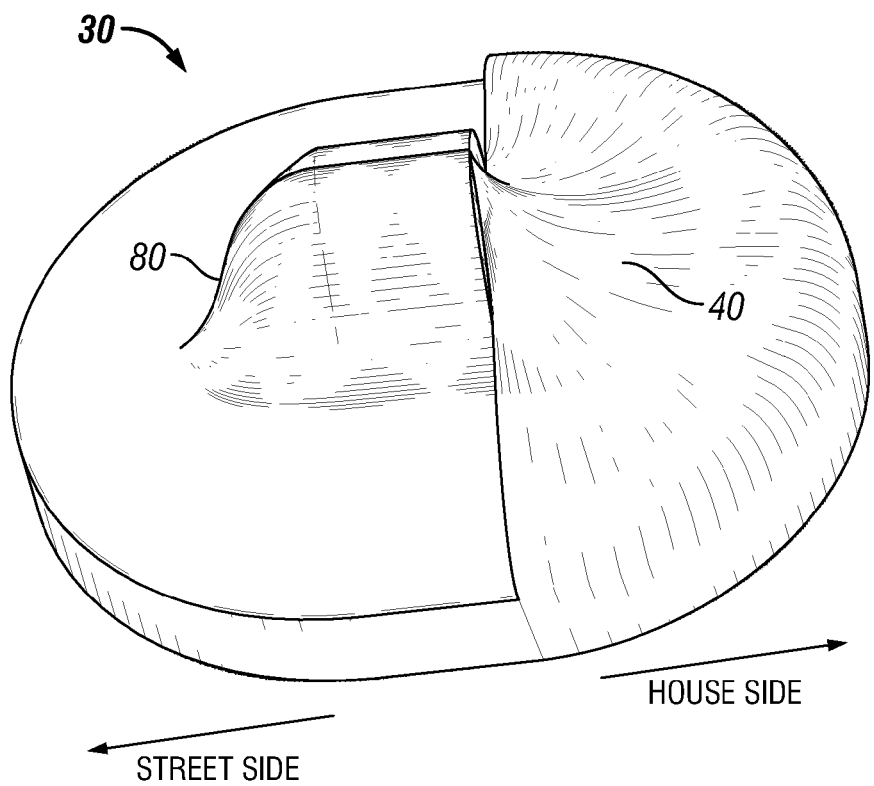
Figure 6D:
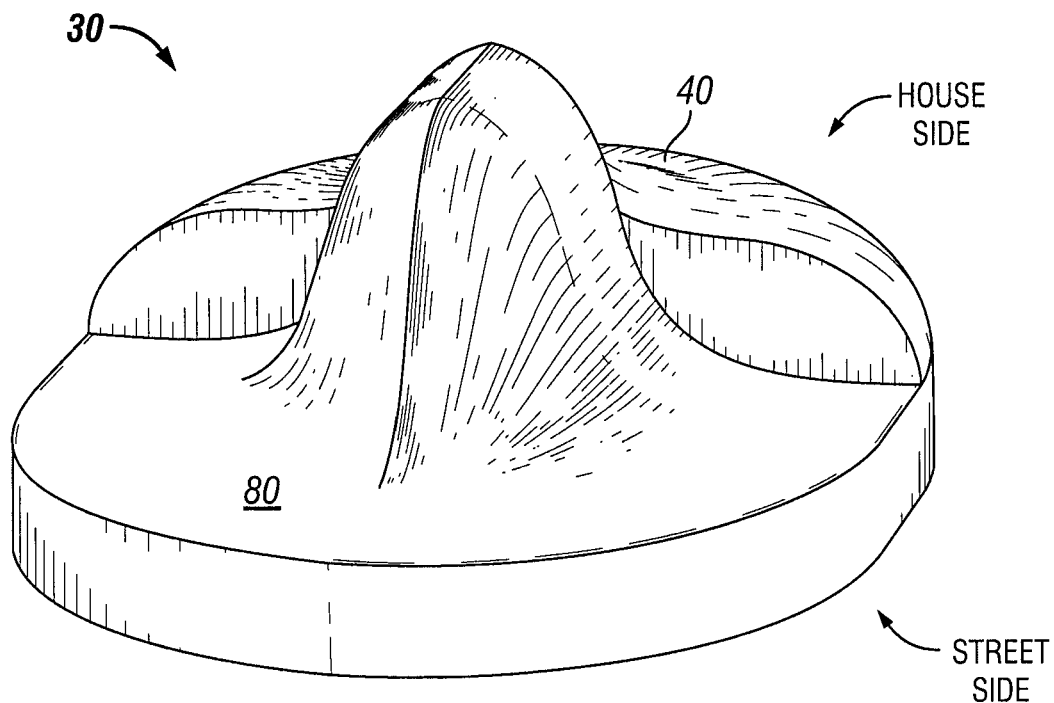
Figure 6E:
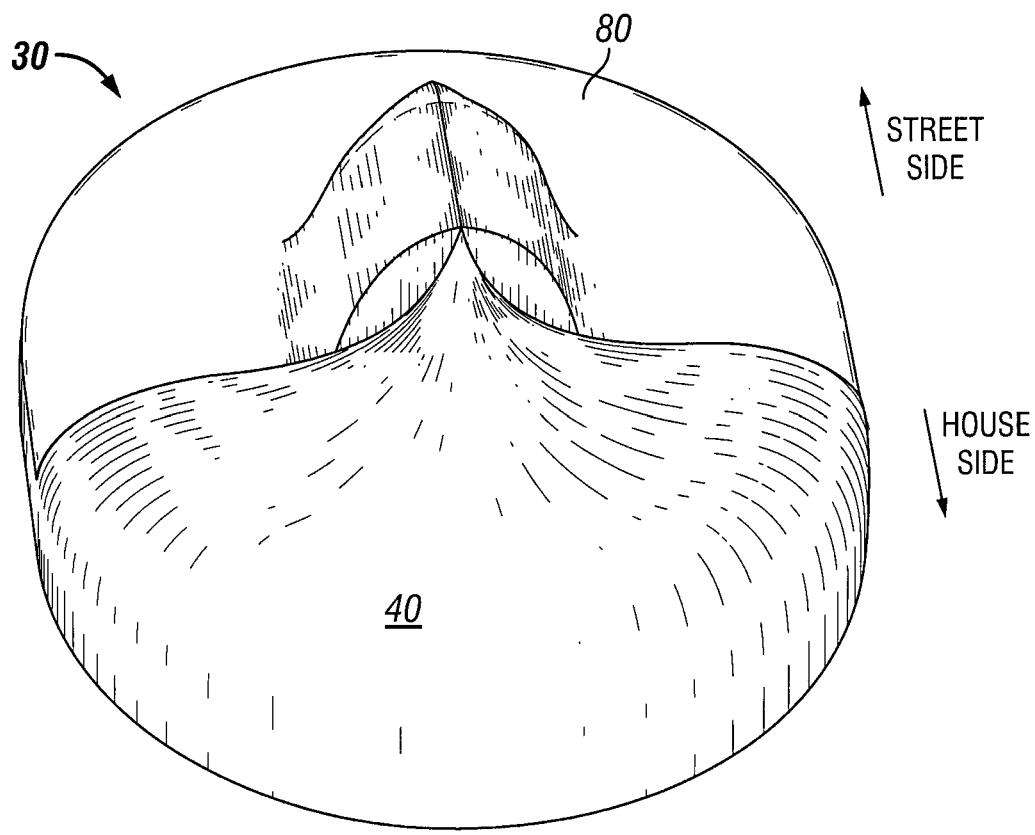

FIGS. 5A, 5B, 5C, 5D, and 5E illustrate the optic 100 as a three-dimensional rendering from five respective perspectives. The rendering of these illustrations represents the optic 100 as an opaque solid to facilitate visualization of transparent optical material. The views of FIGS. 5A, 5B, and 5C are taken from vantage points on the side of the optic 100 that is opposite the light emitting diode 10. Thus, the observer is on the side of the optic 100 that emits light (facing the outer side of the optic 100), but off the axis 25 shown in FIGS. 1, 3 and 4. The views of FIGS. 5D and 5E are taken from the LED-side of the optic 100, looking into a cavity 30 that the optic 100 comprises. Thus, the observer is on the side of the optic that receives light from the light emitting diode 10 (facing the inner side of the optic 100), again off the axis 25. The cavity 30 faces and receives light from the light emitting diode 10.

FIGS. 6A, 6B, 6C, 6D, and 6E illustrate the cavity 30 in the form of a three-dimensional solid rendering (from five perspective views) to facilitate reader visualization. In other words, to show exemplary surface contours of the exemplary cavity 30, FIGS. 6A, 6B, 6C, 6D, and 6E depict a solid that would be formed by filling the cavity 30 with an opaque resin, curing the resin, and then removing the resulting solid.

The illustrated light emitting diode 10 (see FIGS. 1, 2 and 4) comprises an integral dome 20 that provides environmental protection to the light emitting diode's semiconductor materials and that emits the light that the light emitting diode 10 generates. The dome 20 projects or protrudes into the cavity 30 that the optic 100 forms. In certain exemplary embodiments, the dome 20 comprises material that encapsulates the light generating optical element of the light emitting diode 10, for example an optoelectronic semiconductor structure or feature on a substrate of the light emitting diode 10. In certain exemplary embodiments, the dome 20 radiates light at highly diverse angles, for example providing a light distribution pattern that can be characterized, modeled, or approximated as Lambertian.

The illustrated light emitting diode 10 comprises an optical axis 25 associated with the pattern of light emitting from the dome 20 and/or associated with physical structure or mechanical features of the light emitting diode 10. The term "optical axis," as used herein, generally refers to a reference line along which there is some degree of rotational or other symmetry in an optical system, or a reference line defining a path along which light propagates through a system. Such reference lines are often imaginary or intangible lines. In the illustrated embodiment, the optical axis 25 lies in a reference plane 35 that sections the light emitting dome 20, and/or the associated light emission pattern of the light emitting diode 10, into two portions. Although illustrated in a particular position, the reference plane 35 can positioned in other locations that may or may not be arbitrary. As will be appreciated by those of ordinary skill having benefit of this disclosure, a "reference plane" can be thought of as an imaginary or intangible plane providing a useful aid in describing, characterizing, or visualizing something.

The cavity 30 comprises an inner refractive surface 80 opposite an outer refractive surface 70. Light emitted from the street side of the dome 20 and that is headed street side is incident upon the inner refractive surface 80, transmits through the optic 100, and passes through the outer refractive surface 70. Such light may be characterized as a solid angle or represented as a ray or a bundle of rays. Accordingly, the light that is emitted from the light emitting diode 10 and headed street side continues heading street side after interacting with the optic 100. The inner refractive surface 80 and the outer refractive surface 70 cooperatively manipulate this light with sequential refraction to produce a selected pattern, for example concentrating the light downward or outward depending upon desired level of beam spread. In the illustrated embodiment, the light sequentially encounters and is processed by two refractive interfaces of the optic 100, first as the light enters the optic 100, and second as the light exits the optic 100.

One of ordinary skill in the art having benefit of the enabling teaching in this disclosure will appreciate that the inner refractive surface 80 and the outer refractive surface 70 can be formed to spread, concentrate, bend, or otherwise manage the light emitted street side according to various application parameters. In various embodiments, the inner and outer refractive surfaces 80 and 70 can be concave or convex. In one embodiment, the inner refractive surface 80 is convex and the outer refractive surface 70 is convex. In one embodiment, the inner refractive surface 80 is convex and the outer refractive surface 70 is concave. In one embodiment, the inner refractive surface 80 is concave and the outer refractive surface 70 is convex. In one embodiment, the inner refractive surface 80 is concave and the outer refractive surface 70 is concave. In certain embodiments, at least one of the inner refractive surface 80 and the outer refractive surface 70 may be substantially planar or flat.

As shown in FIG. 2, the light emitting diode 10 further emits a section of light 210 that is headed house side or away from the street. This section of light 210 is incident upon an inner refractive surface 40 of the cavity 30 that forms a beam 200 within the optic 100. The refractive surface 40 has an associated optical axis 45. The optical axis 45 can form an angle with the optical axis 25 associated with the light emitting diode 10 itself. The optical axis 45 and the optical axis 25 can form an angle whether they actually intersect or not. The angle can be acute. In certain exemplary embodiments, the angle is between about 10 degrees and about 80 degrees, when measured in side view such as provided in FIG. 2. In certain exemplary embodiments, the angle is in a range between approximately 20 degrees and approximately 70 degrees. In certain exemplary embodiments, the angle is in a range between approximately 30 degrees and approximately 60 degrees. In certain exemplary embodiments, the angle is within 15 degrees of 45 degrees.

In the illustrated embodiment, the inner refractive surface 40 projects, protrudes, or bulges into the cavity 30, which is typically filled with a gas such as air. In an exemplary embodiment, the refractive surface 40 can be characterized as convex and further as a collimating lens. The term "collimating," as used herein in the context of a lens or other optic, generally refers to a property of causing light to become more parallel that the light would otherwise be in the absence of the collimating lens or optic. Accordingly, a collimating lens may provide a degree of focusing.

The beam 200 propagates or travels through the optic 100 along the optical axis 45 and is incident upon a reflective surface 50 that redirects the beam 200 towards an outer refractive surface 60. The redirected beam 200 exits the optic 100 through the outer refractive surface 60, which further steers the refracted beam 220 street side and can produce a desired level of beam spread. The reflective surface 50 is typically totally internally reflective as a result of the angle of light incidence exceeding the "critical angle" for total internal reflection. The reflective surface 50 is typically an interface between solid, transparent optical material of the optic 100 and a surrounding gaseous medium such as air.

Those of ordinary skill in the art having benefit of this disclosure will appreciate that the term "critical angle," as used herein, generally refers to a parameter for an optical system describing the angle of light incidence above which total internal reflection occurs. The terms "critical angle" and "total internal reflection," as used herein, are believed to conform with terminology commonly recognized in the optics field.

As illustrated in the FIG. 2, the refracted beam 220 (which is formed by the section of light 210 sequentially refracted, reflected, and refracted) and the twice refracted section of light (that is emitted by the street side of the light emitting diode) collectively provide street-side illumination.

In certain exemplary embodiments, the optic 100 is a unitary optical element that comprises molded plastic material that is transparent. In certain exemplary embodiments, the optic 100 is a seamless unitary optical element. In certain exemplary embodiments, the optic 100 is formed of multiple transparent optical elements bonded, fused, glued, or otherwise joined together to form a unitary optical element that is void of air gaps yet made of multiple elements.

FIG. 7 illustrates an exemplary array 800 of optics 100 provided in a sheet form to facilitate coupling multiple optics 100 to a corresponding array of light emitting diodes. Such an array of light emitting diodes would typically be under the illustrated sheet, and thus are not illustrated in FIG. 7. Accordingly, an illumination system can comprise a two-dimensional array of light sources, each comprising the illumination system 5 illustrated in exemplary form in FIG. 1 inter alia. The resulting two-dimensional array of light sources can comprise a light module or light bar, one or more of which can be disposed in a luminaire or other lighting apparatus, for example.

In certain exemplary embodiments, the array 800 can be formed of optical grade silicone and may be pliable and/or elastic, for example. In certain exemplary embodiments, the array 800 can be formed of an optical plastic such as polymethyl-methacrylate ("PMMA"), polycarbonate, or an appropriate acrylic, to mention a few representative material options without limitation.

Figure 8:
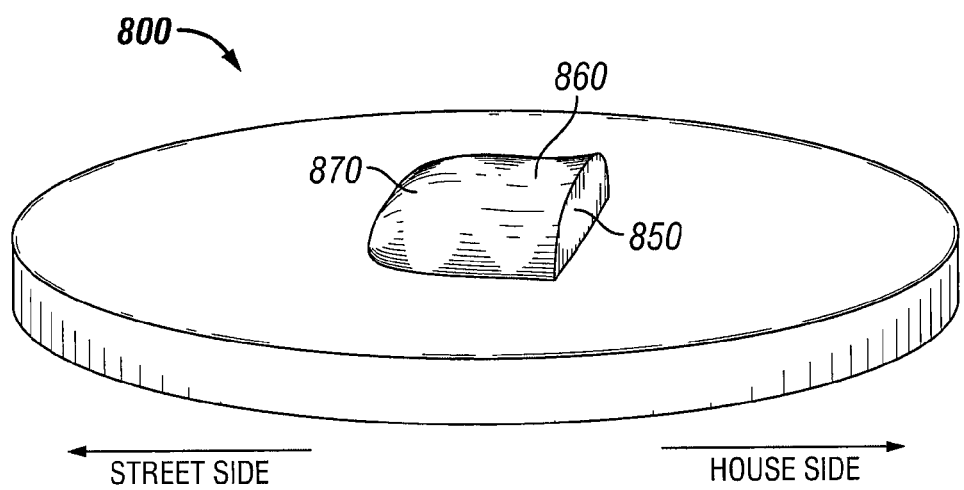
FIG. 8 is a perspective view illustration of another optic for managing light emitted by a light emitting diode according to certain exemplary embodiments of the present technology.
Figure 9:
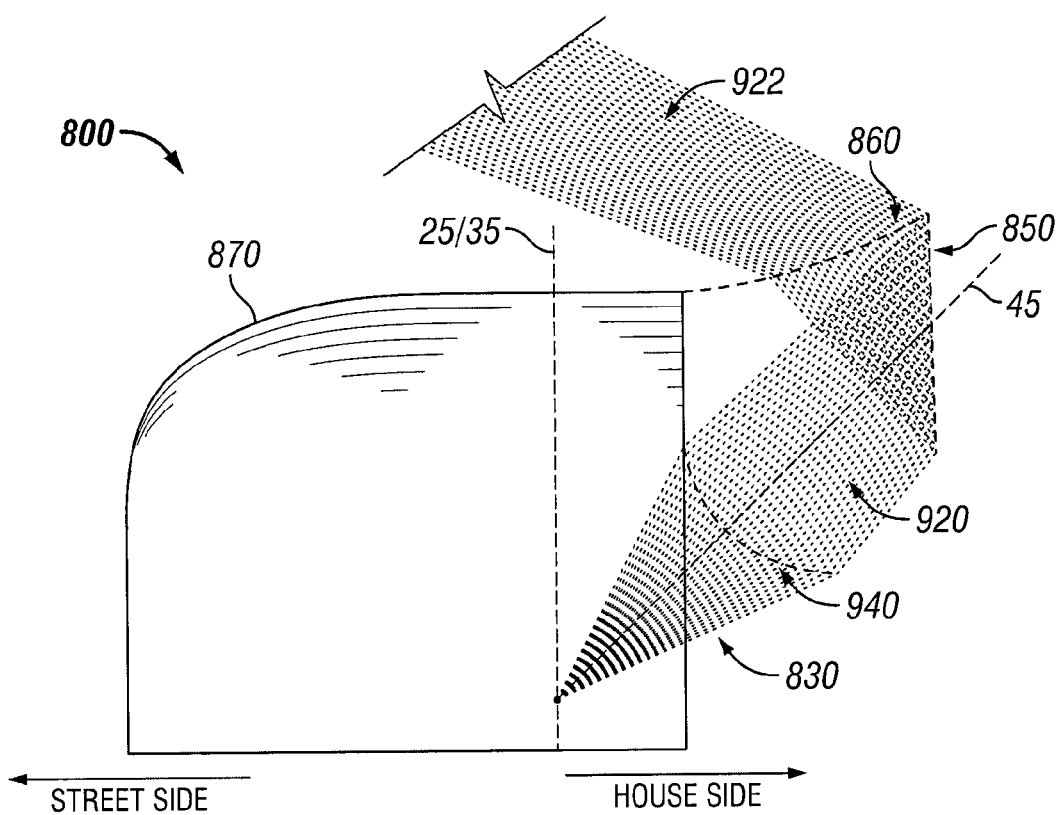
FIG. 9 is an illustration in side view the optic that FIG. 8 illustrates and further illustrates the optic managing rays as could be emitted by an associated light emitting diode according to certain exemplary embodiments of the present technology.
Figure 10:
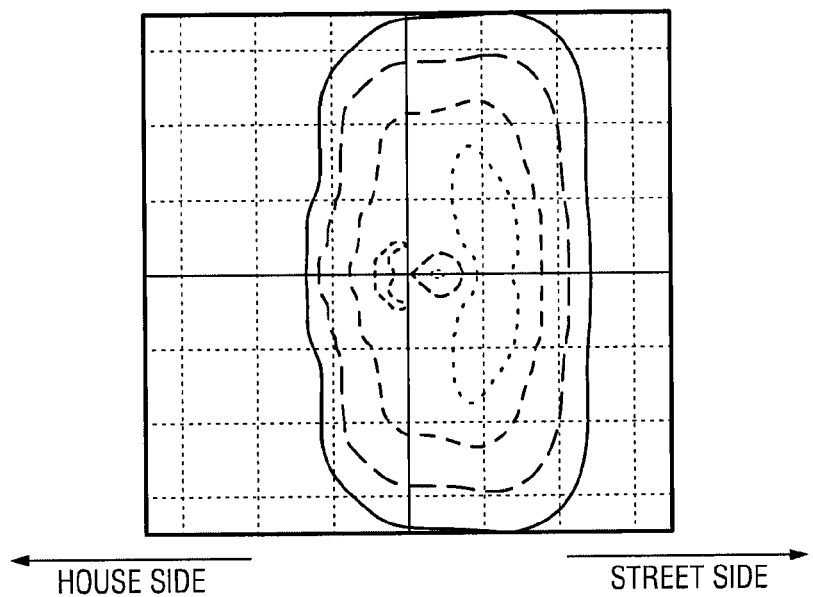
FIG. 10 is an illustration of a representative computer-generated isofootcandle diagram of photometric performance for the optic of FIGS. 8 and 9 as coupled to a light emitting diode, with the lines depicting points of equal illuminance according to certain exemplary embodiments of the present technology.

Turning now to FIGS. 8, 9, and 10, these figures describe another exemplary embodiment of the present technology. FIG. 8 illustrates a perspective view of an optic 800 that manages light emitted from a light emitting diode 10. The light emitting diode 10 is not illustrated in FIGS. 8, 9, and 10, but is depicted FIG. 1 and elsewhere as discussed above. Accordingly, the optic 800 can be coupled to a light emitting diode 10 or other light source for managing emitted light to form a light pattern comprising redirected light. FIG. 9 illustrates the optic 800 in side view overlaid with representative ray paths as would begin at a light emitting diode 10.

FIG. 10 illustrates an exemplary diagram of photometric performance, wherein the lines plot common illuminance, analogous to how a contour map plots land elevation. Thus, FIG. 10 describes a computer-generated isofootcandle diagram of exemplary photometric performance for the optic of FIGS. 8 and 9 as coupled to a light emitting diode, with the lines depicting points of equal illuminance.

As shown in FIGS. 8 and 9, the optic 800 comprises an outer refractive surface 870. Light emitted from the light emitting diode 10 in a street direction progresses towards the street through the outer refractive surface 870, which can refract the light to produce desired beam spread. As discussed above, light emitted from a street-side of the light emitting diode 10 can propagate out of the light emitting diode, through an air gap, into the optic 800, and then out of the optic 800 through the outer refractive surface 870. Such an air gap may be filled with air, nitrogen, or other suitable gas.

Light emitted from the house side of the light emitting diode propagates through the cavity 830 and is incident upon a inner refractive surface 940 that forms a beam 920. The beam 920 propagates through the optic and is incident upon a reflective surface 850 of the optic 800. The reflective surface 850 directs the beam 920 out of the optic 800 through the outer refractive surface 860, applying refraction to produce the beam 922 traveling towards the street as desired. In the illustrated embodiment, the outer refractive surface 860 is concave, but may be convex or substantially planar in other embodiments.

The reflective surface 850 can be oriented with respect to the beam 920 to exceed the "critical angle" for total internal reflection, so that the reflective surface 850 totally internally reflects the beam 920. Accordingly, the internally reflective surface 850 can be formed by an interface between air and plastic or other transparent material of the optic 800. Alternatively, the internally reflective surface 850 can comprise a reflective metallic coating.

Figure 11:
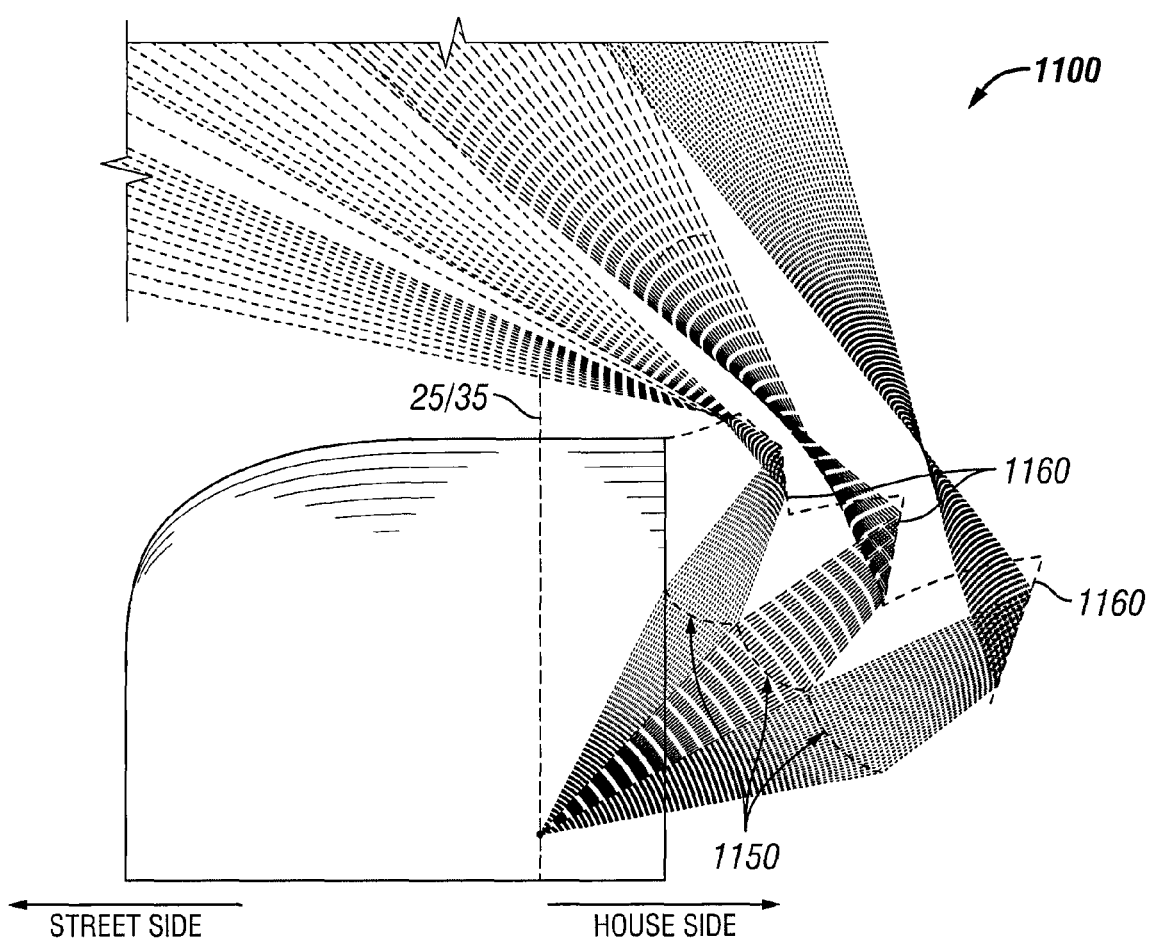
FIG. 11 is an illustration in side view of another optic for managing light emitted by a light emitting diode and further illustrates the optic managing rays as could be emitted by an associated light emitting diode according to certain exemplary embodiments of the present technology.
Figure 12:
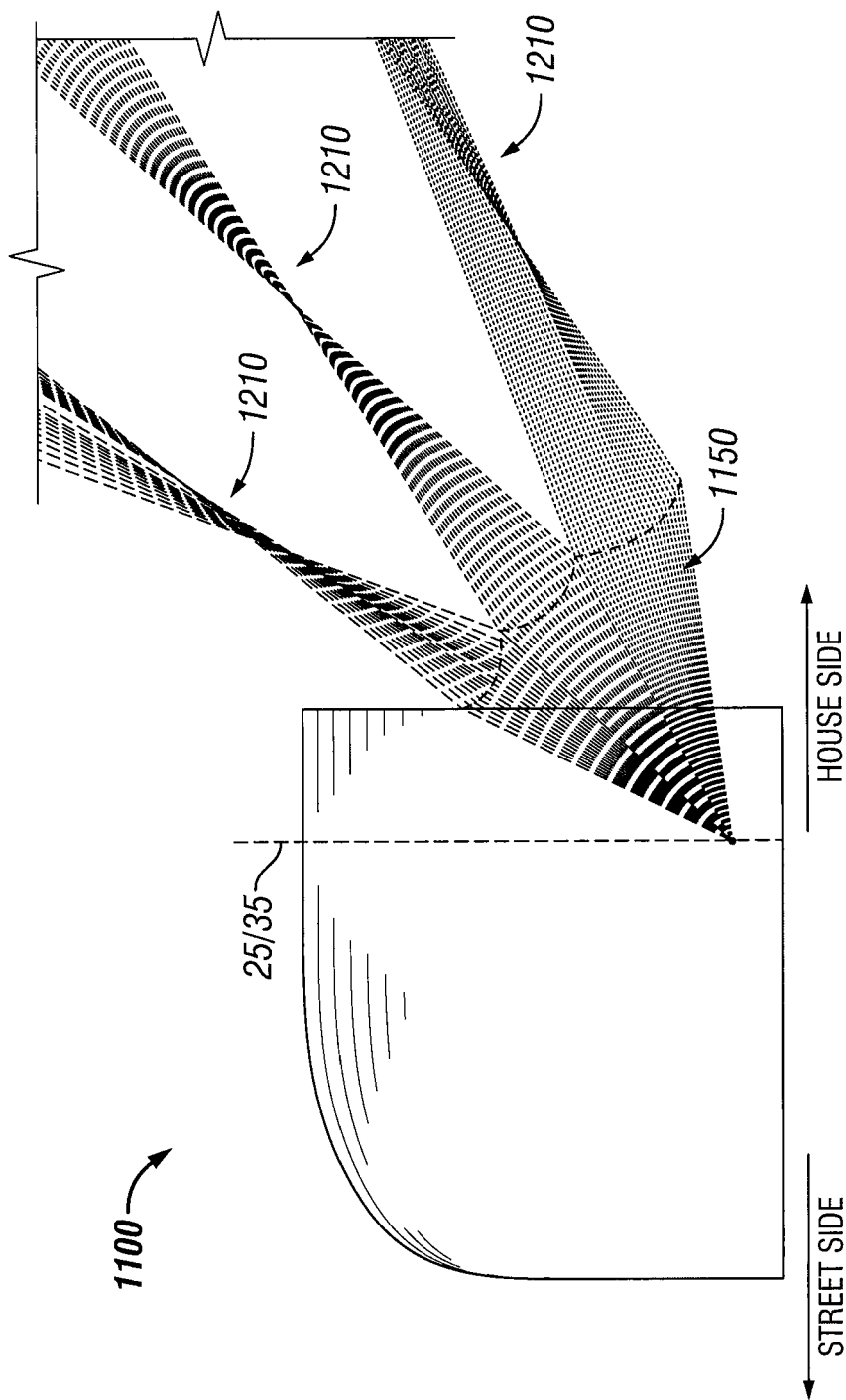
FIG. 12 is an illustration in side view of a representative optical function of inner refractive features of the optic that FIG. 11 illustrates, wherein optical function of exterior features of the optic are ignored in order to promote reader visualization, according to certain exemplary embodiments of the present technology.

FIGS. 11 and 12 describe certain exemplary embodiments in which an optic 1100 comprises multiple inner refractive surfaces 1150, each forming a separate beam that is individually reflected and then refracted out of the optic 1100. Similar to FIGS. 8, 9, and 10 as discussed above, a light generating element is not shown in FIG. 11 in order to promote reader visualization. In a typical application, the optic 1100 can be coupled to a light emitting diode 10 or other appropriate light source, and the optic 1100 can manage the generated light.

FIG. 12 illustrates the optic 1100 in side view overlaid with representative ray paths as would begin at an exemplary light emitting diode 10 (see light emitting diode 10 illustrated in FIG. 2). In the illustrated embodiment, light emitted in the house side direction encounters the three inner refractive surfaces 1150, each receiving a respective solid angle of emitted light. The three inner refractive surfaces 1150, which can be convex from the illustrated viewing perspective, form three respective beams of light. As illustrated in FIG. 12 and discussed below, the three beams can have different focal lengths 1210.

Three totally internally reflective features 1160 respectively reflect the three beams to increase street-side illumination. The configurations of the totally internally reflective features 1160 avoid occlusion or unwanted distortion of those three redirected beams thereby avoiding uncontrolled incidence or grazing off the outer surface of the optic 1100. In the illustrated exemplary embodiment, two of the three totally internally reflective features 1160 are undercut, and all three jut outward.

FIG. 12 illustrates how the inner refractive surfaces 1150 create beams with different focal lengths 1210, which would be reflected and refracted by the totally internally reflective features 1160 as shown in FIG. 11 in a physical implementation. That is, to convey an exemplary principle of the embodiment of FIG. 11, FIG. 12 illustrates the three inner refractive surfaces 1150 forming three beams, and the beams are depicted as propagating within optical material of the optic 1100 without interacting with any subsequent optical features.

Figure 13A:
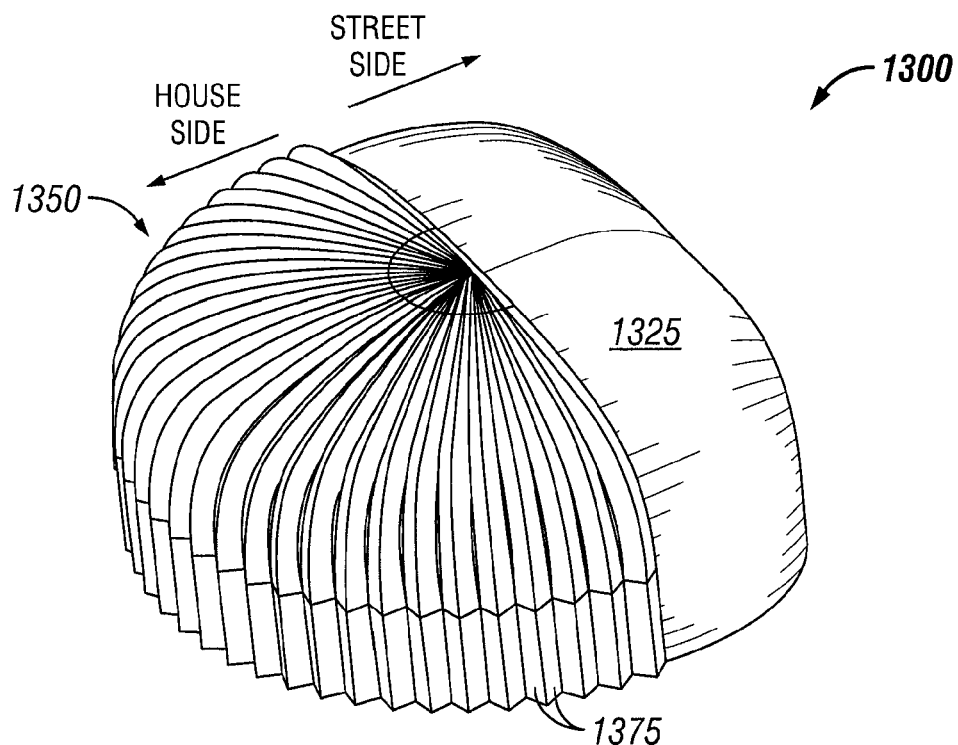
FIGS. 13A and 13B (collectively FIG. 13) are illustrations of an illumination system that comprises a light emitting diode coupled to another optic according to certain exemplary embodiments of the present technology.
Figure 13B:
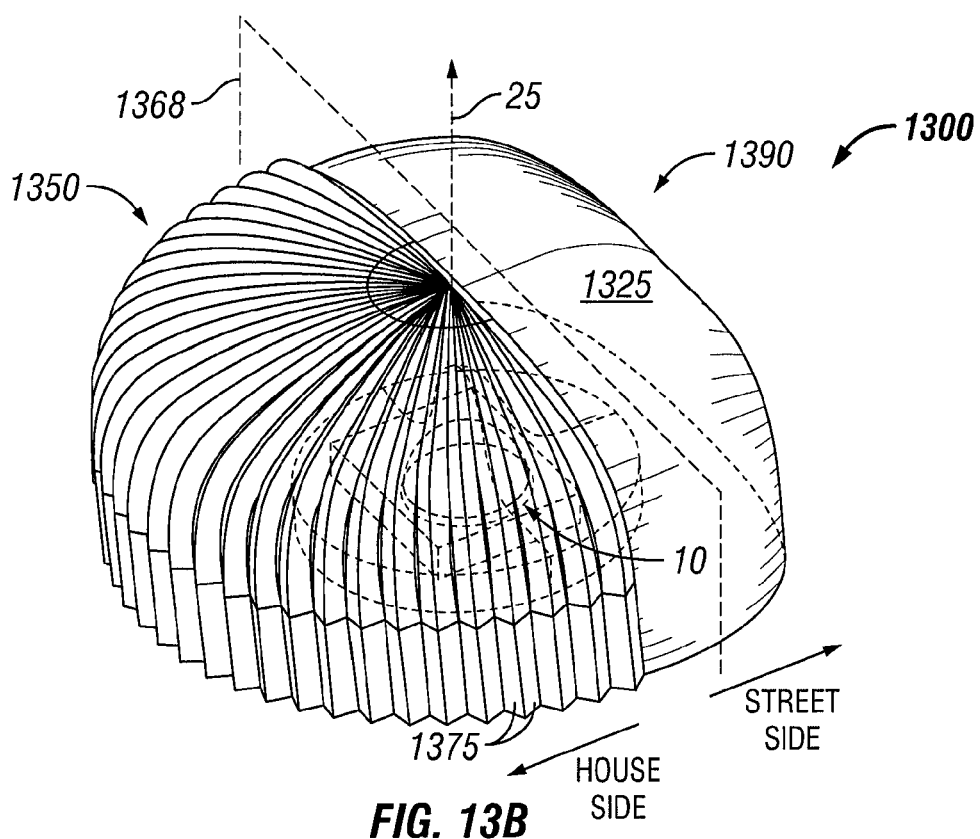

FIGS. 13A and 13B, 14, 15, 16, and 17 describe certain exemplary embodiments in which the street side of the optic 1300 is smooth and the house side comprises prismatic grooves 1350, as an exemplary embodiment of a pattern of retroreflectors. As illustrated, a reference plane 1368, containing an optical axis 25, that demarcates the two sides of the optic 1300 and can cut through the dome 20 of the light emitting diode 10 (see FIG. 1 as the dome is not labeled in FIG. 13B to avoid line clutter). FIGS. 13A and 13B are renderings respectively illustrating the optic 1300 as an opaque solid and as a transparent line drawing that shows an exemplary light emitting diode 10 positioned to emit light into the optic 1300.

In the illustrated illumination system 1390, the prismatic grooves 1350 arch over the optic 1300 and the light emitting diode 10. Light incident on the prismatic grooves 1350 is retroreflected back over the light emitting diode 10, resulting in redirection to emerge from the smooth refractive surface 1325 headed in a street-side direction. In an exemplary embodiment, each prismatic groove 1350 comprises a retroreflector. Each prismatic groove 1350 comprises a pair of totally internally reflective surfaces 1375 or facets that collaboratively reflect light back in the general direction from which the light came. In certain exemplary embodiments, the totally internally reflective surfaces 1375 are substantially perpendicular to one another. In certain exemplary embodiments, the totally internally reflective surfaces 1375 meet to form a corner functioning as a retroreflecting edge of a cube, and may be characterized as a cube edge.

In operation, a light ray is incident on the first surface of the pair of totally internally reflective surfaces 1375. The first surface of the pair of totally internally reflective surfaces 1375 bounces the light to the second surface of the pair of totally internally reflective surfaces 1375. The second surface of the pair of totally internally reflective surfaces 1375 bounces the light backwards, providing retroreflection. Accordingly, in certain exemplary embodiments, the pair of totally internally reflective surfaces 1375 can form a two-bounce retroreflector.

Figure 16:
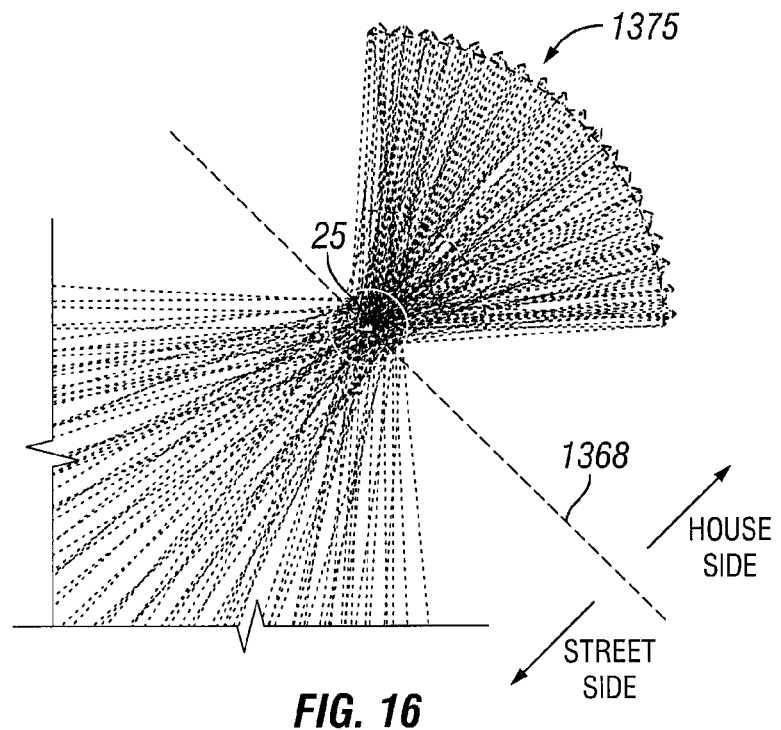
FIG. 16 is a plan view illustration of representative computer-generated ray traces for an embodiment of the illumination system that FIG. 13 illustrates according to certain exemplary embodiments of the present technology.

When viewed looking at the light emitting diode 10 straight down the optical axis 25, as shown in FIG. 16, the retroreflected light ray is parallel to the light ray incident on a prismatic groove 1350. Meanwhile, if viewed in a side view taken for example perpendicular to the reference plane 1368, the light ray would have an angle of reflection substantially equal to the angle of incidence. Accordingly, in the illustrated embodiment, the inclination of the light ray can be preserved (albeit reversed), so that the light ray can continue vertically, thereby retroreflecting back over the light emitting diode 10.

Figure 14:
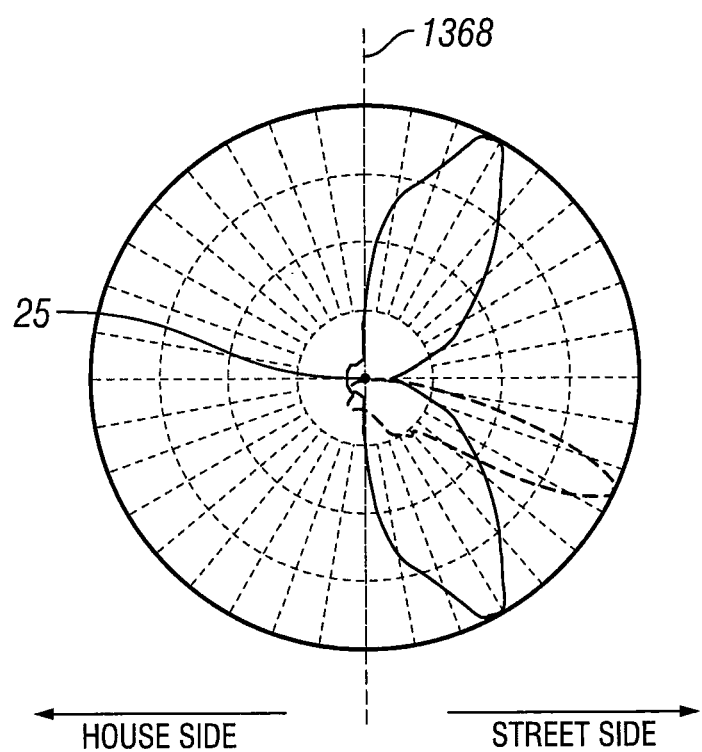
FIG. 14 is an illustration of a representative computer-generated intensity polar plot for the illumination system that FIG. 13 illustrates according to certain exemplary embodiments of the present technology.
Figure 15:
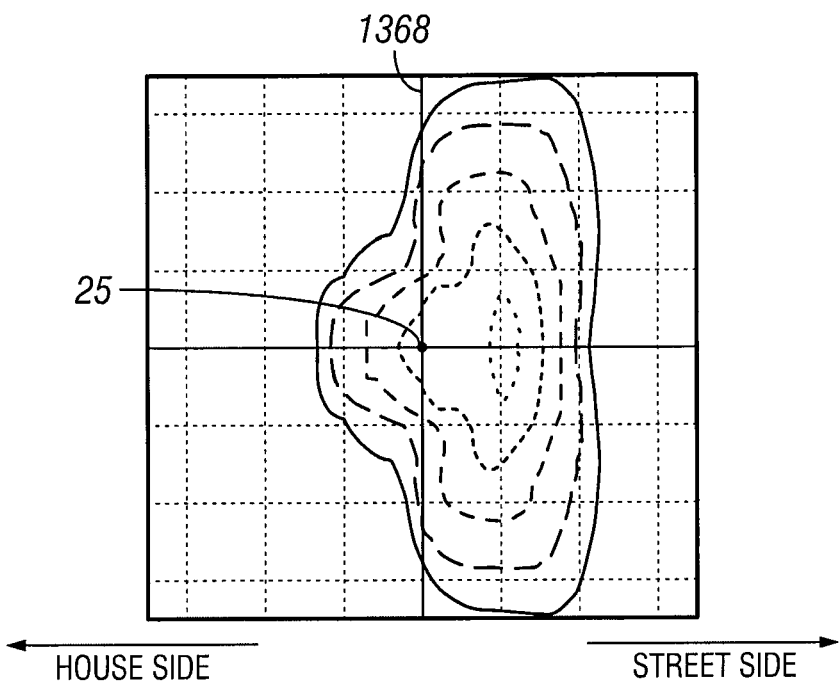
FIG. 15 is an illustration of a representative computer-generated illuminance plot for the illumination system that FIG. 13 illustrates according to certain exemplary embodiments of the present technology.

FIG. 14 illustrates an intensity polar plot based on a computer simulation for the illumination system 1390. FIG. 15 illustrates an isofootcandle plot based on a computer simulation for the illumination system 1390. FIGS. 16 and 17 illustrate ray tracing analyses, from plan perspective, specifically looking down the optical axis 25. FIGS. 16 and 17 further illustrate how varying the dimensions of the prismatic grooves 1350/1775 can control the level of light leaking through the prismatic grooves as a result of certain rays being oriented for total internal reflection while other rays are oriented below the critical angle and will be refracted out of the prismatic groove. Increasing groove width, as illustrated in FIG. 17, can increase house-side illumination, for example.

An exemplary process for managing light emitted by a light emitting diode 10 will now be discussed in further detail with reference to FIG. 18, which illustrates a flow chart of an embodiment of such a process in the form of process 1800, entitled "Manage Light."

Certain steps in the processes described herein may naturally precede others for the present technology to function as taught. However, the present technology is not limited to the order of the steps described if such order or sequence does not alter the functionality of the present technology to the level of rendering the technology inoperative or nonsensical. That is, it is recognized that some steps may be performed before or after other steps or in parallel with other steps without departing from the scope and spirit of the present technology.

The following discussion of process 1800 will refer to certain elements illustrated in FIGS. 1, 2, 3, 4, 5A, 5B, 5C, 5D, 5E, 6A, 6B, 6C, 6D, and 6E. However, those of skill in the art will appreciate that various embodiments of process 1800 can function with and/or accommodate a wide range of devices, systems, and hardware (including elements illustrated in other figures as well as elements not expressly illustrated) and can function in a wide range of applications and situations. Accordingly, such referenced elements are exemplary, are provided without being exhaustive and without limitation, and are among many other supported by the present technology.

Referring now to FIG. 18, at step 1805 of process 1800, the light emitting diode 10 converts electricity into light and emits light. The emitted light and/or the light emitting diode 10 has an associated optical axis 25. A portion of the emitted light is emitted in the street-side direction. Another portion, including the section 210, is emitted in the house-side direction.

At step 1810, the inner refractive surface 80 and the outer refractive surface 70 of the optic 100 transmit and refract the light emitted in the desired, street-side direction. Accordingly, the optic 100 directs light to and illuminates the street.

At step 1815, which typically proceeds substantially in parallel with step 1810, the section of light 210 that is headed house side encounters the inner refractive surface 40 of the optic 100. The inner refractive surface 40 forms a beam 200 propagating within the solid optical material of the optic 100, along the optical axis 45. The optical axis 45 is typically oriented at an acute angle relative to the optical axis 25 and/or with respect to the light emitting diode's substrate (e.g. the flat portion of the LED chip from which the dome 20 projects).

At step 1820, which likewise typically proceeds substantially in parallel with step 1810, the beam 200 encounters the reflective surface 50, which is typically totally internally reflective but may be mirrored with a metal coating as an alternative suitable for certain applications. The reflective surface 50 reverses the beam 200, sending the beam 200 in a street-side direction.

At step 1825, the beam 200 exits the optic 100 heading street side, and may be refracted upon exit. Step 1825 may likewise proceed substantially in parallel with Step 1810.

At step 1830, the optic 100 emits a pattern of light that, as illustrated in FIG. 10, can be biased towards a street. Process 1800 iterates from step 1830, and management of light to provide biased illumination continues.

Technology for managing light emitted from a light emitting diode or other source has been described. From the description, it will be appreciated that an embodiment of the present technology overcomes the limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art. Therefore, the scope of the present technology is to be limited only by the claims that follow.

What is claimed is:

1. An illumination system comprising:
   an optic comprising a first surface that defines a cavity and a second surface opposite the first surface; and
   a light emitting diode disposed at least partially in the cavity, the light emitting diode having a first optical axis,
   wherein a cross section of the optic taken at the optical axis of the light emitting diode shows asymmetry of the first surface with respect to the optical axis and asymmetry of the second surface with respect to the optical axis, and the cross section includes:
      the second surface having a first and second portion both substantially located on a first side of the optical axis, wherein the first portion is a total internally reflective (TIR) surface and the second portion is a refractive surface, and
      wherein the first surface of the optic includes a convex focusing element that is substantially located on the first side of the optical axis, wherein a portion of light emitted by the light emitting diode on the first side of the optical axis is focused by the focusing element outward with respect to the optical axis and toward the TIR surface, wherein the TIR surface reflects the focused light toward the refractive surface that refracts the reflected light across the optical axis to a second side of the optical axis, so that the illumination system produces an overall illumination pattern that is biased to the second side of the axis.

2. The illumination system of claim 1, wherein the convex focusing element is configured to project a substantially collimated beam of light onto the TIR surface.

3. The illumination system of claim 2, wherein the TIR surface comprises an air interface.

4. The illumination system of claim 1, wherein the TIR surface is located entirely on the first side of the optical axis.

5. The illumination system of claim 1, wherein the illumination system is a street luminaire.

6. The illumination system of claim 1, wherein the optic is seamless, and
   wherein a light emitting dome of the light emitting diode protrudes into the cavity.

7. The illumination system of claim 1, wherein a gas is disposed between the light emitting diode and the first surface.

8. The illumination system of claim 1, wherein the optic is one optic in an array of optics.

9. The illumination system of claim 1, wherein the optic comprises a street side and a house side, wherein the house side of the optic is disposed on the first side of the optical axis, and wherein the street side of the optic is disposed on the second side of the optical axis.

10. The illumination system of claim 1, wherein the refractive surface is concave and is located entirely on the first side of the optical axis.

11. An apparatus comprising:
    a light emitting diode (LED) having an optical axis; and
    a lens, wherein the lens includes an inner surface and an outer surface, wherein the inner surface faces the LED, and wherein a cross section of the lens taken at the optical axis of the LED shows asymmetry of the inner surface with respect to the optical axis and asymmetry of the outer surface with respect to the optical axis, and the cross section of the lens includes:
       the outer surface having a first and second portion both substantially located on a first side of the optical axis, wherein the first portion is a total internally reflective (TIR) surface and the second portion is a refractive surface, and
       wherein the inner surface of the lens includes a convex focusing element that is substantially located on the first side of the optical axis, wherein a portion of light emitted by the LED on the first side of the optical axis is focused by the focusing element toward the TIR surface with the focused light and the optical axis forming an acute angle, wherein the TIR surface reflects the focused light toward the refractive surface that refracts the reflected light across the optical axis to a second side of the optical axis, so that the apparatus outputs an overall illumination pattern that is biased to the second side of the axis.

12. The apparatus claim 11, wherein the convex focusing element is configured to project a substantially collimated beam of light onto the TIR surface.

13. The apparatus of claim 12, wherein the TIR surface comprises an air interface.

14. The apparatus of claim 11, further comprising an array of lenses, wherein the array of lenses includes the lens.

15. The apparatus of claim 11, wherein a sheet of lenses comprises said lens and is configured for coupling to an array of LEDs that comprises said LED.

16. The apparatus of claim 11, wherein the lens comprises a street side and a house side, the house side of the lens disposed on the first side of the optical axis, the street side of the lens disposed on the second side of the optical axis.

17. The apparatus of claim 11, comprising a street luminaire.

18. A lens comprising:
an inner surface and an outer surface, wherein the inner surface faces a light emitting diode (LED), and wherein a cross section of the lens taken at an optical axis of the LED shows asymmetry of the inner surface with respect to the optical axis and asymmetry of the outer surface with respect to the optical axis, and the cross section of the lens includes:
the outer surface having a first and second portion both substantially located on a first side of the optical axis, wherein the first portion is a total internally reflective (TIR) surface and the second portion is a refractive surface, and
wherein the inner surface of the lens includes a convex focusing element that is substantially located on the first side of the optical axis, wherein a portion of light emitted by the LED on the first side of the optical axis is focused by the focusing element toward the TIR surface with the focused light and the optical axis forming an acute angle, wherein the TIR surface reflects the focused light toward the refractive surface that refracts the reflected light across the optical axis to a second side of the optical axis, resulting in an overall illumination pattern that is biased to the second side of the axis.

19. The lens of claim 18, wherein the lens is one lens in an array of lenses.

20. The apparatus of claim 18, wherein the lens comprises a street side and a house side, the house side of the lens disposed on the first side of the optical axis, the street side of the lens disposed on the second side of the optical axis.

* * * * *